United States Patent
Isobe

(10) Patent No.: US 9,912,885 B2
(45) Date of Patent: Mar. 6, 2018

(54) IMAGE PICKUP APPARATUS HAVING PARTIAL READOUT FUNCTION OR SKIP READOUT FUNCTION AND PHOTOGRAPHING APPARATUS INCLUDING THE SAME

(71) Applicant: CANON KABUSHIKI KAISHA, Tokyo (JP)

(72) Inventor: Shingo Isobe, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/608,682

(22) Filed: Jan. 29, 2015

(65) Prior Publication Data

US 2015/0222828 A1    Aug. 6, 2015

(30) Foreign Application Priority Data

Jan. 31, 2014 (JP) .................................. 2014-017340

(51) Int. Cl.
  *H04N 5/353* (2011.01)
  *H04N 5/345* (2011.01)
(52) U.S. Cl.
  CPC ......... *H04N 5/3532* (2013.01); *H04N 5/3454* (2013.01); *H04N 5/3456* (2013.01)
(58) Field of Classification Search
  CPC ........................... H04N 5/2353; H04N 5/3532
  USPC ..................................................... 348/230.1
  See application file for complete search history.

(56) References Cited

U.S. PATENT DOCUMENTS

| 6,084,634 A * | 7/2000 | Inagaki .............. H04N 5/23245 348/243 |
| 7,154,542 B1 | 12/2006 | Yuki et al. |
| 2003/0025815 A1 | 2/2003 | Hashimoto |
| 2005/0219368 A1* | 10/2005 | Kobayashi ............. G03B 17/00 348/207.11 |

(Continued)

FOREIGN PATENT DOCUMENTS

| JP | 2001078081 A | 3/2001 |
| JP | 2005094142 A | 4/2005 |

(Continued)

OTHER PUBLICATIONS

Office Action issued in U.S. Appl. No. 14/608,627, mailed Oct. 31, 2016.

(Continued)

*Primary Examiner* — Roberto Velez
*Assistant Examiner* — Cynthia Segura
(74) *Attorney, Agent, or Firm* — Rossi, Kimms & McDowell LLP

(57) ABSTRACT

Provided is an image pickup apparatus capable of reading out and outputting pixel data of a partial area of a rolling shutter type image sensor. The image pickup apparatus includes: a readout condition setter configured to set a readout condition from the image sensor; a charge time setter configured to set charge time of the image sensor; a controller configured to control charging of the image sensor and readout from the image sensor so as to achieve constant charge time irrespective of the readout condition; and an image signal output unit configured to output a pixel signal read out by the controller.

10 Claims, 20 Drawing Sheets

(56) References Cited

U.S. PATENT DOCUMENTS

| | | | |
|---|---|---|---|
| 2007/0132867 A1* | 6/2007 | Rhee | H04N 3/155 348/302 |
| 2008/0291306 A1* | 11/2008 | Totori | H04N 5/2254 348/296 |
| 2009/0021621 A1* | 1/2009 | Hashimoto | H04N 5/3456 348/300 |
| 2009/0180014 A1 | 7/2009 | Noda et al. | |
| 2009/0213237 A1* | 8/2009 | Ishida | H04N 5/232 348/221.1 |
| 2010/0060748 A1* | 3/2010 | Tsuchiya | H04N 5/23212 348/222.1 |
| 2010/0134667 A1 | 6/2010 | Suzuki et al. | |
| 2011/0267533 A1 | 11/2011 | Hirose | |
| 2011/0317039 A1* | 12/2011 | Ise | H04N 5/3742 348/240.2 |
| 2013/0001404 A1* | 1/2013 | Meynants | H01L 27/14609 250/208.1 |
| 2013/0063653 A1* | 3/2013 | Kita | H04N 5/23245 348/362 |
| 2013/0112851 A1* | 5/2013 | Ihori | H04N 5/32 250/208.1 |
| 2013/0271631 A1* | 10/2013 | Tatsuzawa | H04N 5/2353 348/296 |
| 2014/0314420 A1* | 10/2014 | De Bruijn | H05B 37/0272 398/127 |
| 2015/0103980 A1* | 4/2015 | Kaercher | G01N 23/207 378/205 |
| 2015/0189201 A1* | 7/2015 | Bridges | H04N 5/35554 348/46 |
| 2015/0222827 A1* | 8/2015 | Isobe | H04N 5/3456 348/296 |
| 2015/0358571 A1* | 12/2015 | Dominguez Castro | H04N 5/345 348/308 |
| 2017/0237927 A1* | 8/2017 | Kajimura | H01L 27/14612 250/226 |

FOREIGN PATENT DOCUMENTS

| | | |
|---|---|---|
| JP | 2005277709 A | 10/2005 |
| JP | 2007173986 A | 7/2007 |
| JP | 2008016977 A | 1/2008 |
| JP | 2010130398 A | 6/2010 |
| JP | 2010181751 A | 8/2010 |
| JP | 2010183558 A | 8/2010 |
| JP | 2010271379 A | 12/2010 |
| JP | 4757013 B2 | 8/2011 |
| JP | 201 31 8331 * | 9/2013 |
| JP | 2014017551 A | 1/2014 |

OTHER PUBLICATIONS

Notice of Allowance issued in U.S. Appln. No. 14/608,627 dated Apr. 27, 2017.
Notice of Allowance issued in U.S. Appl. No. 14/608,627 dated Jul. 26, 2017.
Office Action issued in Japanese Application No. 2014-017340 dated Nov. 14, 2017.

* cited by examiner

IMAGE PICKUP APPARATUS HAVING PARTIAL READOUT FUNCTION OR SKIP READOUT FUNCTION AND PHOTOGRAPHING APPARATUS INCLUDING THE SAME

BACKGROUND OF THE INVENTION

Field of the Invention

The present invention relates to an image pickup apparatus, and more particularly, to an image pickup apparatus having a partial readout function or a skip readout function, and a photographing apparatus including the same.

Description of the Related Art

At a factory manufacturing line, an image pickup apparatus for inputting images has come to be used in place of visual inspection conducted by a human inspector. Such an image pickup apparatus is also referred to as a machine vision camera, and used for inspecting various types of components or products with a computer or a digital input/output device. In recent years, in order to improve inspection accuracy, an image pickup apparatus having ten million or more pixels has come to be used. Similarly, in a consumer digital camera, the number of pixels is increasing more and more in order to improve captured image quality.

With the increasing needs for a greater number of pixels and higher image quality, in recent years, as an image pickup element to be used for a camera, a complementary metal-oxide semiconductor (CMOS) sensor of a rolling shutter type is widely used. In the rolling shutter type, lines of image pickup elements are sequentially exposed. Thus, while exposure time for carrying out exposure by a sensor is set by a user, in control in the camera, the exposure is carried out by a line unit corresponding to the set time.

When a moving image is captured by such an image pickup apparatus and a signal is read out from all pixels of a pixel array, readout time is longer as the number of pixels is larger. Consequently, in the case of moving image capturing, the number of captured images per second is reduced. Further, a data amount for outputting a captured video to the outside becomes greater, and thus a fame rate decreases. For example, in the machine vision camera, total readout time changes with the number of pixels for imaging, and the frame rate changes with the number of pixels output to the outside of the image pickup apparatus.

In an inspection system using the machine vision camera, shortening of inspection time is simultaneously demanded. Accordingly, the number of readout pixels is reduced by reading out a pixel signal from only an interest area among those in which images are captured by the camera, thereby increasing a frame rate. When the frame rate can be increased, the inspection time of the entire system can be shortened.

In the rolling shutter type, charge processing for photoelectric conversion and readout processing of a photoelectrically converted signal are closely linked with each other. For example, when the total readout time is shortened by selection of the interest area, charge time of the sensor may be simultaneously shortened.

In Japanese Patent Application Laid-Open No. 2001-078081, there is disclosed a problem in that exposure time shortens when a part of a pixel in array is designated as an interest area to carry out readout only from the interest area while skipping the remaining unnecessary areas. Accordingly, in Japanese Patent Application Laid-Open No. 2001-078081, optimal exposure is achieved by a diaphragm or a gain applied to an image signal.

In Japanese Patent Application Laid-Open No. 2010-181751, there is disclosed an example of improving, in the case of moving image capturing, a moving image response by skipping readout to shorten overall readout time. In this case, edge enhancement is applied in order to improve visibility for a photographer, and improvement is achieved for exposure.

However, in the above-mentioned related art, a gain is applied to achieve optimal exposure. In the related art, while exposure is secured, there is a problem in that image quality deteriorates due to post-processing after photographing. In the inspection use as described above, various exposure time periods are set, and the interest area is frequently changed. As a result, in the related art, there is a problem in that image quality changes each time setting of the interest area is changed. In the camera for inspection, a high-quality and high-definition captured image is required.

SUMMARY OF THE INVENTION

The present invention provides an image pickup apparatus capable of carrying out partial readout and simultaneously achieving reduction of image quality deterioration and maintenance of exposure even when setting of an interest area is changed, and a photographing apparatus including the image pickup apparatus.

According to one embodiment of the present invention, there is provided an image pickup apparatus capable of reading out and outputting pixel data of a partial area of a rolling shutter type image sensor, the image pickup apparatus including: a readout condition setter configured to set a readout condition from the image sensor; a charge time setter configured to set charge time of the image sensor; a controller configured to control charging of the image sensor and readout from the image sensor so as to achieve constant charge time irrespective of the readout condition; and an image signal output unit configured to output a pixel signal read out by the controller.

According to one embodiment of the present invention, it is possible to provide the image pickup apparatus capable of maintaining exposure even when setting of the interest area is changed and reducing image quality deterioration accompanying the setting change of the interest area, and the photographing apparatus including the image pickup apparatus.

Further features of the present invention will become apparent from the following description of embodiments with reference to the attached drawings.

DESCRIPTION OF THE EMBODIMENTS

Figure 1:
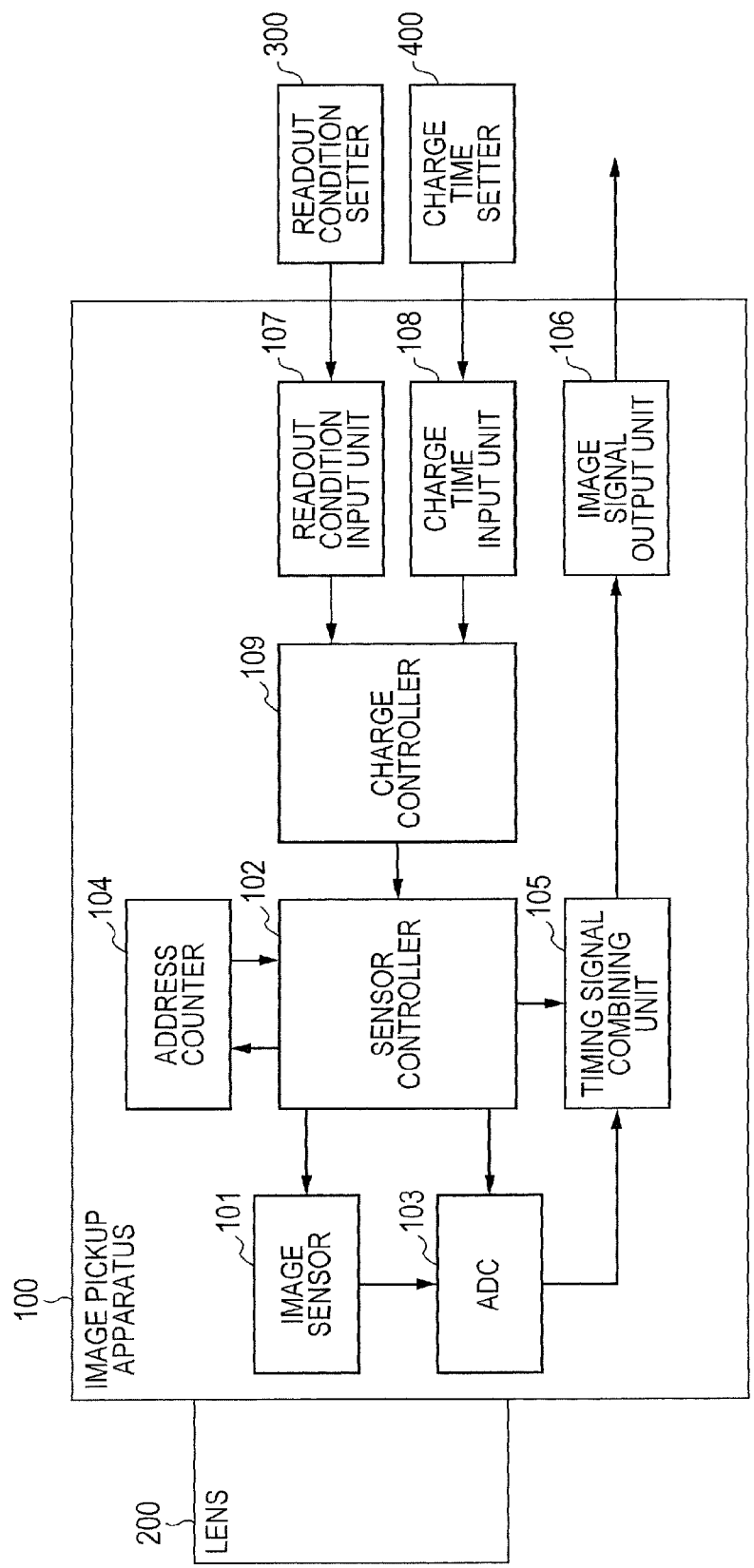
FIG. 1 is a diagram illustrating a configuration of an image pickup apparatus according to a first embodiment of the present invention.

Hereinafter, embodiments of the present invention are described in detail with reference to the accompanying drawings. FIG. 1 is a configuration diagram according to an embodiment of the present invention.

First Embodiment

FIG. 1 illustrates a configuration of an image pickup apparatus according to a first embodiment of the present invention.

An image pickup apparatus 100 includes an image pickup system including an image sensor 101, and carries out image pickup processing by a sensor controller 102, an analog/digital converter (ADC) 103, and an address counter 104. A lens 200 is configured outside the image pickup apparatus 100, and the image pickup apparatus 100 and the lens 200 serve as a photographing apparatus. A light flux that has passed through the lens 200 forms an image on the image sensor 101 of the image pickup apparatus 100. The lens 200 includes such elements as a diaphragm unit, a zooming lens unit, and a focus lens unit (not shown). The zooming lens unit included in the lens 200 may have a variable or fixed focal length. The sensor controller 102 controls a charge operation or a readout operation of the image sensor 101. When image pickup processing of the image sensor 101 is carried out by the sensor controller 102, an image pickup signal is output from the image sensor 101, and subjected to AD conversion at the ADC 103. The address counter 104 calculates an address that is an object line or an object pixel of the image sensor 101 subjected to charge control or readout control by the sensor controller 102. When skipping readout is carried out from the image sensor 101, among all pixels of the image sensor 101, addresses of pixels to be read out are output as object pixels, while addresses of pixels not to be read out are skipped. A timing signal combining unit 105 inputs image pickup signal data from the ADC 103 and a signal from the address counter 104 via the sensor controller 102, and produces a frame synchronous signal, a vertical synchronous signal, or a horizontal synchronous signal with the image pickup signal data.

A readout condition setter 300 sets coordinate data of area that is an interest area (readout area) or sets the number of lines of a skip unit from the outside of the image pickup apparatus 100. The number of lines of a skip unit is described in detail below. For example, a personal computer (PC) is used as the readout condition setter 300. A readout condition input unit 107 inputs and stores setting data input by the readout condition setter 300. The "line" means a plurality of pixels to be read out simultaneously in the rolling shutter method, and the plurality of pixels are normally one to several lines of the image sensor. Needless to say, however, the plurality of pixels may not be arrayed in a line direction, that is, in a horizontal direction of the image sensor, but may be arrayed in a vertical direction. For convenience, the plurality of pixels arrayed in the vertical direction (normally, "column") are also referred to as "line" herein.

A charge time setter 400 sets charge time as a shutter speed of the image pickup apparatus 100 from the outside of the image pickup apparatus 100. For example, a PC is used as the charge time setter 400. A charge time input unit 108 stores a range setting value for charging or reading out all the pixels of the image sensor 101. The readout condition setter 300 and the charge time setter 400 may be configured in the same PC. Setting of the charge time by the charge time setter may be input manually or automatically changed in accordance with other set photographing conditions (e.g., high-speed photographing mode where one frame interval is short, or photographing mode automatically changed in accordance with photographing environment). The charge time described herein is charge time of each pixel in the image sensor, or charge time of each line in the image sensor. The present invention aims to enable those charge time to be the same (error within 1%) for a corresponding pixel (a pixel at the same place) or a corresponding line before and after a change of the readout condition.

A charge controller 109 inputs the setting data from the readout condition input unit 107 and the charge time input unit 108. The charge controller 109 outputs the readout setting data stored in the readout condition input unit 107 to the address counter 104 via the sensor controller 102.

An image signal output unit 106 adds, in order to set correspondence in coordinates between the readout area input by the readout condition input unit 107 and each interest area of the image pickup signal, a necessary timing signal in the image pickup signal data output from the timing signal combining unit 105, and generates an output image signal. The image signal output unit 106 outputs the output image signal generated by the timing signal combining unit 105 to the outside of the image pickup apparatus 100.

Figure 2:
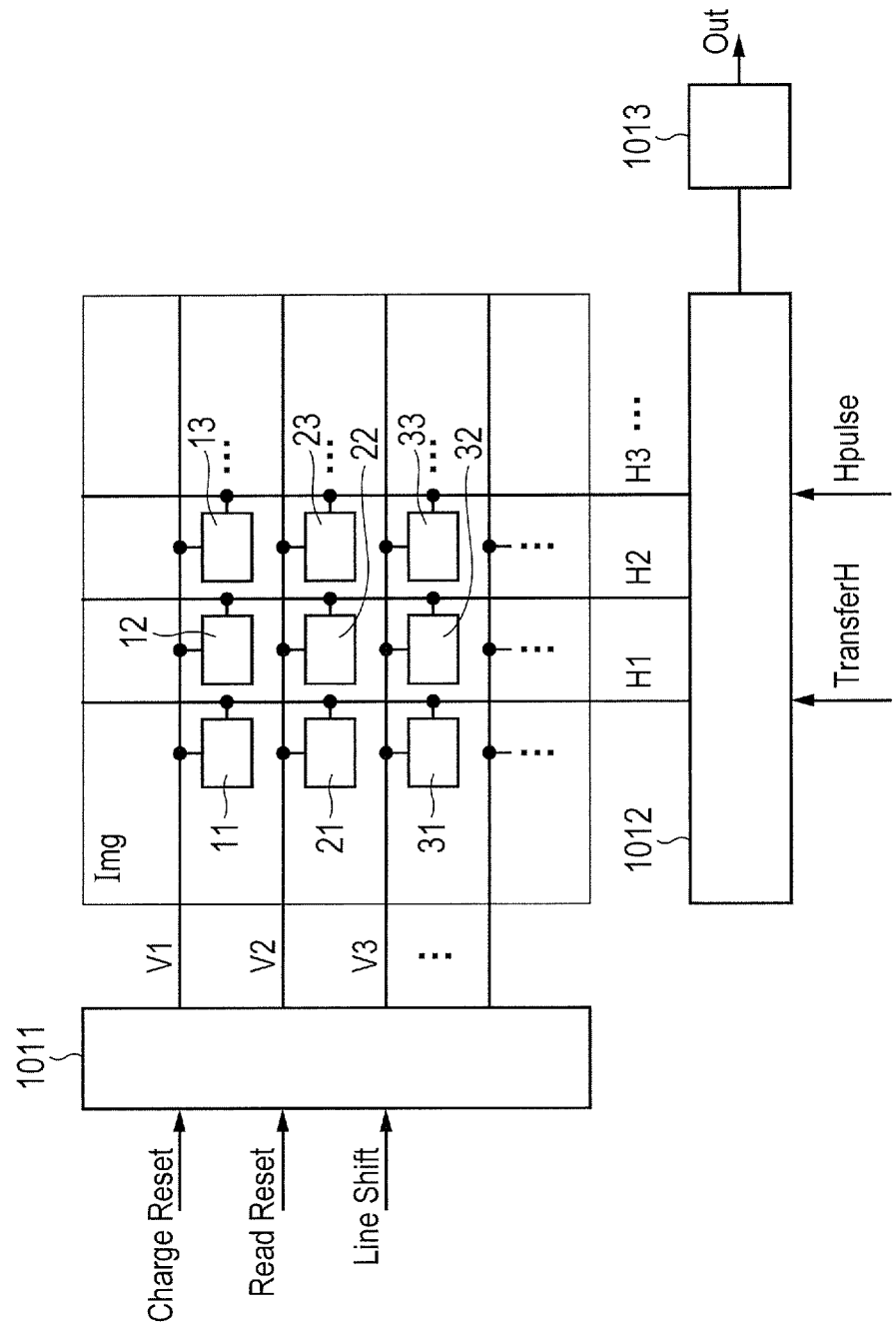
FIG. 2 is a diagram illustrating a structure of an image sensor included in the image pickup apparatus according to the first embodiment.

FIG. 2 illustrates a structure of the image sensor 101. In FIG. 2, the image sensor 101 includes an image pickup element Img, and parts 11 to 33 of a pixel array are included in the image pickup element Img. A vertical circuit 1011 and a horizontal circuit 1012 are connected to each of the pixels in the image pickup element Img through V1, V2, V3, . . . H1, H2, and H3.

Three control lines ChargeReset, ReadReset, and LineShift are connected to the vertical circuit 1011 illustrated in FIG. 2. Those control lines are connected to the sensor controller 102 illustrated in FIG. 1. The vertical circuit 1011 includes a charge line selection register and a readout object line selection register (not shown). The line selection registers can select a charge object line and a readout object line of each line in the image pickup element Img respectively. Through the control line ChargeReset, the charge object line selected by each line selection register is reset as a head line, and charging of the head line is started. Through the control line ReadReset, the readout object line selected by the line selection register is reset as a head line. The control line LineShift is a control line for incrementing the charge object line and the readout object line selected by the line selection registers. When a Hi signal is input to the control line LineShift once, a line next to the object line selected by each line selection register is referred to. This embodiment is described by way of example where the number of control lines LineShift is one. However, the control lines LineShift may be separately configured to individually increment lines that are referred to by the charge line selection register and the readout object line selection register.

Two control lines TransferH and Hpulse are connected to the horizontal circuit 1012 illustrated in FIG. 2. As in the case of the vertical circuit 1011, those control lines are connected to the sensor controller 102 illustrated in FIG. 1. After a one-shot pulse has been input to the control line LineShift, through the control line TransferH, pixel data of the readout object line selected by the line selection register of the vertical circuit 1011 is transferred to the horizontal circuit 1012. For example, when the readout object line selected by the line selection register is at V2, image pickup signals 21 to 23 are transferred to the horizontal circuit 1012 through the control line TransferH. The control line Hpulse is a control line for reading out the image pickup signals transferred to the horizontal circuit 1012. When a pulse for readout control is input to the control line Hpulse, an analog image pickup signal is output from Out through an amplifier 1013 illustrated in FIG. 2. This image pickup signal is connected to the ADC 103 illustrated in FIG. 1. The ADC 103 subjects the input image pickup signal to AD conversion in synchronization with the control line Hpulse. Through the control line Hpulse, clocks are generated corresponding to the number of readout pixels.

Figure 3:
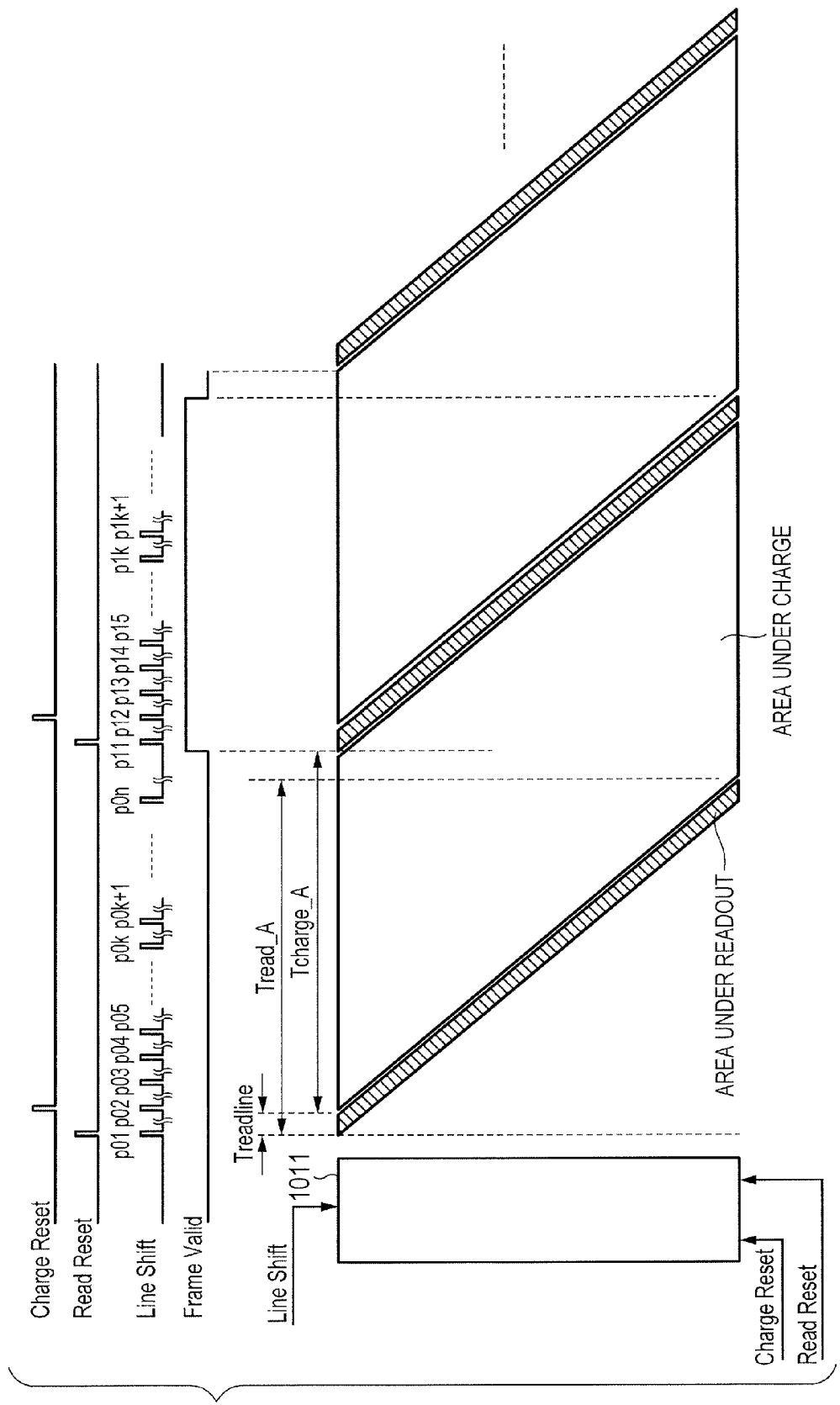
FIG. 3 is a diagram illustrating image pickup control in the image pickup apparatus according to the first embodiment.
Figure 4:
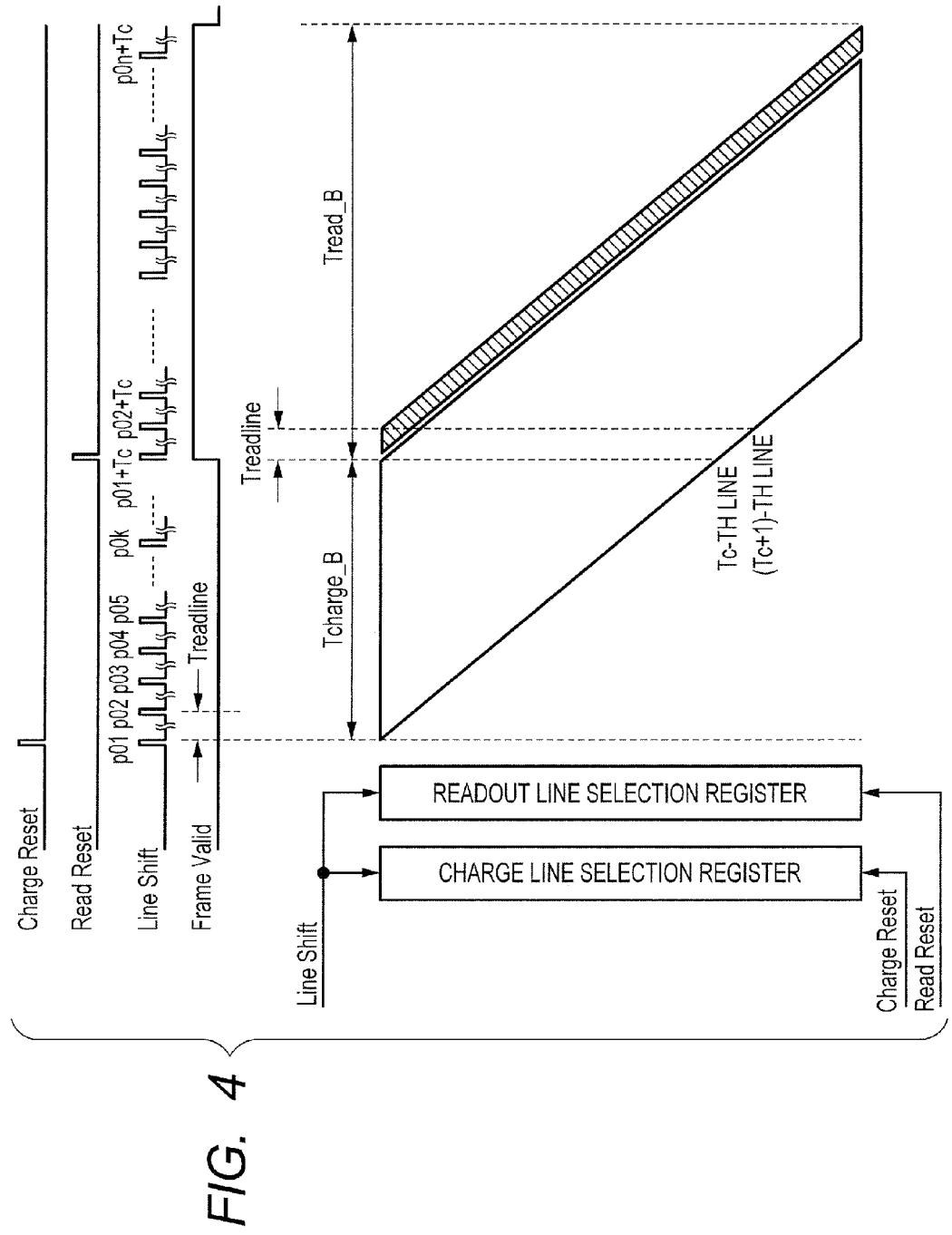
FIG. 4 is a diagram illustrating image pickup control in the image pickup apparatus according to the first embodiment.

An example of the image pickup control of the image sensor 101 is described referring to FIGS. 3 and 4. The image sensor 101 is a rolling shutter type image sensor. In the example, the number of readout object lines of the image sensor 101 is n. As described below, readout time of n lines as the readout object is compared with charge time per line, and two types of image pickup control are switched based on a size relationship thereof. FIG. 3 illustrates an example in which the charge time per line is equal to or longer than the readout time of the n lines.

FIG. 3 illustrates connection of the control lines ChargeReset, ReadReset, and LineShift to the vertical circuit 1011, and a timing chart in the upper part. In FIG. 3, a horizontal axis indicates a time direction. A vertical axis in the lower part illustrated in FIG. 3 indicates a schematic diagram of charge/readout operation in a line direction of the image sensor 101. When pulses are input to the control lines ReadReset and LineShift at a time p01, a first line of the image sensor 101 is started to be read out. After the input of the pulse to the control line LineShift at the time p01, a pixel signal of the first line is read out by using the control lines TransferH and Hpulse (not shown) of the horizontal circuit 1012 in FIG. 3. During the readout of the pixel signal, AD conversion is carried out by the ADC 103 illustrated in FIG. 1 in synchronization with the control line Hpulse. Treadline illustrated in FIG. 3 indicates time necessary for reading out a pixel signal of a single line. After readout of a single line is completed, one-shot pulses are input to the control lines LineShift and ChargeReset at a time p02. Treadline is equal to a time interval between the time p01 and the time p02. The Treadline is sufficiently longer than the Hi time of the one-shot pulse input to the control line LineShift at the time p01 or p02. In this case, by the line selection registers of the vertical circuit 1011, a second line is selected as a readout object line and a first line is selected as a charge object line. A pixel signal of the first line is read out from the time p01 to the time p02, and then charging of the first line is started at the time p02. From the time p02 to the time p03, as in the aforementioned case, a pixel signal of the second line is read out during the time of the Treadline. As indicated by "area under readout" and "area under charge", between the lines, charging and readout are carried out by a time difference equal to the Treadline time. Thereafter, similarly, when charging and readout are carried out up to the last n-th line of the image sensor during the time from p01 to p0n, readout is carried out again from the first line at the time p11. At the time p11, processing is carried out, which is similar to the processing to the horizontal circuit 1012 carried out at the time p01. An image pickup signal of the first line read out at the time p11 has been charged during the time from p02 to p11. For example, an image pickup signal of the second line read out at the time p12 has been charged during the time from p03 to p12. An image pickup signal read out during the time from p01 to p0n is a 0th frame after camera activation, and a dummy is read out. A FrameValid signal illustrated in FIG. 3 is valid for each frame after the time p11 for reading out the image pickup signal charged at the 0th frame, that is, after the first frame, and an image pickup signal of the 0th frame read out from the time p01 to the time p0n is invalid.

Thus, in FIG. 3, while the 0th frame is sequentially read out from the time p01 to the time p0n, charging is sequentially started at the 0th fame at the each line after the time p02. As illustrated in FIG. 3, Tread_A indicates readout time from the first line to the last n-th line. Time acquired by multiplying the Treadline by the number of lines n is Tread_A. Tcharge_A indicates charge time of the first line. In FIG. 3, the charge time Tcharge_A of the each line from the first line to the last n-th line is equal to Tcharge_A0, and thus uniform. When the Tread_A and the Tcharge_A illustrated in FIG. 3 are respectively denoted as Tread and Tcharge, a relationship between the Tcharge and the Tread illustrated in FIG. 3 is represented by Expression (1):

$$T\text{charge} \geq T\text{read} \qquad (1)$$

In the case of a relationship represented by Expression (2) different from that of Expression (1), image pickup control illustrated in FIG. 4 is carried out.

$$T\text{charge} < T\text{read} \qquad (2)$$

In FIG. 4, as in the case illustrated in FIG. 3, the control lines ChargeReset, ReadReset, and LineShift are connected to the vertical circuit 1011, and a timing chart is illustrated in the upper part. First, at a time p01, by inputting one-shot pulses to the control lines ChargeReset and LineShift, charging of the first line of the image sensor 101 is started. Then, at a time p02, by inputting a one-shot pulse to the control line LineShift, charging of the second line of the image sensor 101 is started. A time interval between the time p01 and the time p02 is Treadline as in the case illustrated in FIG. 3. Similarly, one-shot pulses are input to the control line LineShift at the time interval of the Treadline, that is, at p01, p02, . . . p0k, . . . . Thus, by inputting the one-shot pulses to the control line LineShift, charging is sequentially started while being accompanied by Treadline time shifting at the first line, the second line, . . . the k-th line, . . . . Then, when one-shot pulses are input to the control lines ReadReset and LineShift at a time p01+Tc, the charging of the first line of the image sensor 101 is ended. After the one-shot pulses have been input at the time p01+Tc, as in the case illustrated in FIG. 3, a pixel signal of the first line is read out by using the control lines TransferH and Hpulse of the horizontal circuit 1012 (not shown). In this case, an image pickup signal charged during the time from p01 to p01+Tc, that is, during charge time of Tcharge_B, is read out. Tc is a value acquired by dividing the charge time Tcharge_B per line by the Treadline. At the time p01+Tc, charging of the Tc-th line is started simultaneously with readout of the first line. Thereafter, by the same readout method as that illustrated in FIG. 3, at the time p01+Tc and thereafter, readout is sequentially carried out line by line until the n-th line that is the last line with a time difference of Treadline. Thus, time for reading out all the lines of the image sensor 101 is indicated by Tread_B. When the numbers of readout lines are equal, the Tread_B is equal to the Tread_A illustrated in FIG. 3.

Thus, the image pickup control under Expression (2) illustrated in FIG. 4 is an example of image pickup control carried out when the charge time is shorter than the readout time. At the readout start time of the first line and thereafter, charging of the Tc-th line and its following lines is started. In the case of continuous photographing, after the end of reading out all the readout object lines, charging or readout of a next frame is carried out.

Figure 5:
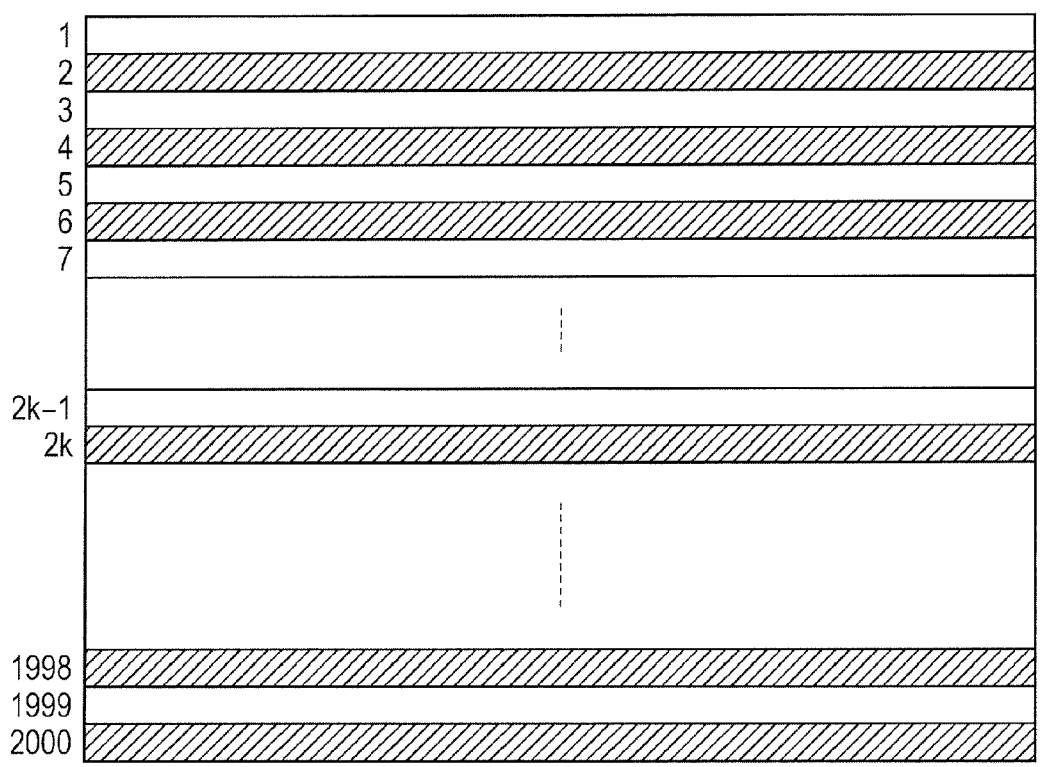
FIG. 5 is a diagram illustrating a setting example of a readout object line in an image pickup element according to the first embodiment.
Figure 6:
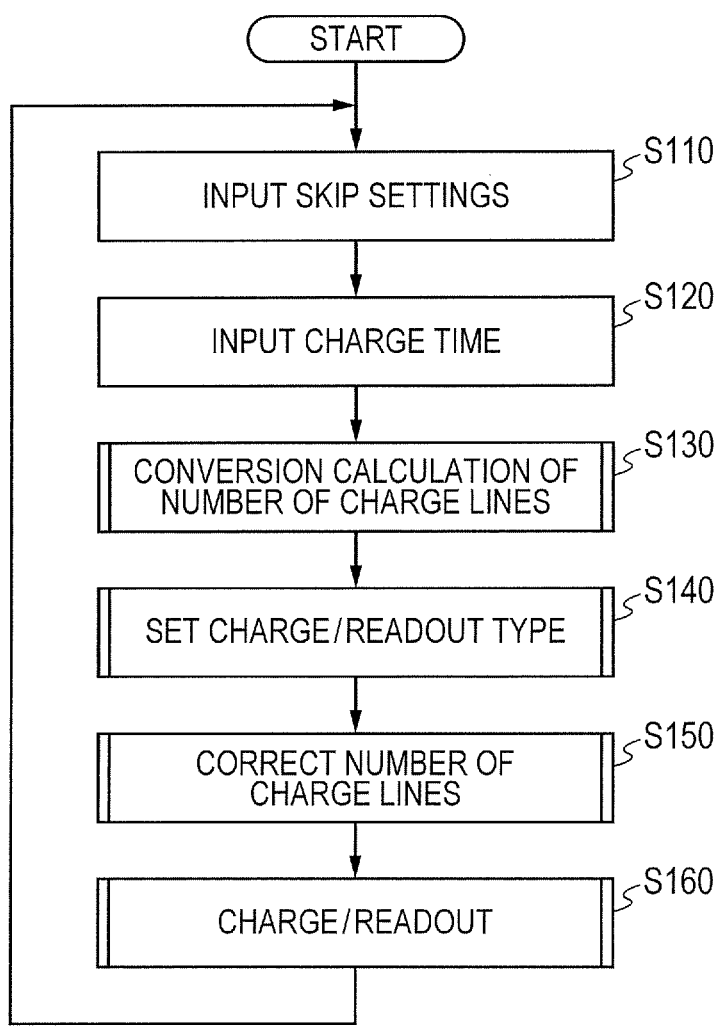
FIG. 6 is a flowchart illustrating readout processing of the image pickup apparatus according to the first embodiment.

Based on the example of the image pickup control, in this embodiment, an image pickup example of reading out an image pickup signal at every other line is described. FIG. 5 illustrates an example where the image sensor 101 includes 2,000 lines of image pickup elements. In this embodiment, a method is described where exposure levels are set equal between when the 2,000 lines illustrated in FIG. 5 are read out and when only the even lines of 2k lines (k is natural number) indicated by shaded parts are selected to be read out. FIG. 6 is a flowchart illustrating processing carried out by the image pickup apparatus 100 according to this embodiment. When power is turned ON for the image pickup apparatus 100, the processing is carried out in order from Step S110 illustrated in FIG. 6.

First, in Step S110 of the flowchart illustrated in FIG. 6, the number of lines of a skip unit is input. In the present invention, the skip unit is defined as the number of lines of a unit pattern of readout lines and skip lines that are repeated. In this case, the number of lines of a skip unit is input through the readout condition input unit 107 by the readout condition setter 300 illustrated in FIG. 1. As described above, in this embodiment, only the even lines are set to be read out, and thus the number of lines of a skip unit is "2". According to the definition of the skip unit, this means that a single line is read out and a single line is skipped. A readout setting value is stored in the readout condition input unit 107 illustrated in FIG. 1, and input to the charge controller 109. After the execution of Step S110 illustrated in FIG. 6, the processing proceeds to Step S120.

In Step S120, charge time is input as a shutter speed. In this case, the charge time is input through the charge time input unit 108 by the charge time setter 400 illustrated in FIG. 1. The charge time is stored in the charge time input unit 108 illustrated in FIG. 1, and input to the charge controller 109. A unit of the charge time is generally "second", for example, ½50 or ¹⁄500 seconds. Alternatively, the unit may be "millisecond". The charge time in the present invention is real time. After the execution of Step S120 illustrated in FIG. 6, the processing proceeds to Step S130.

Figure 7:
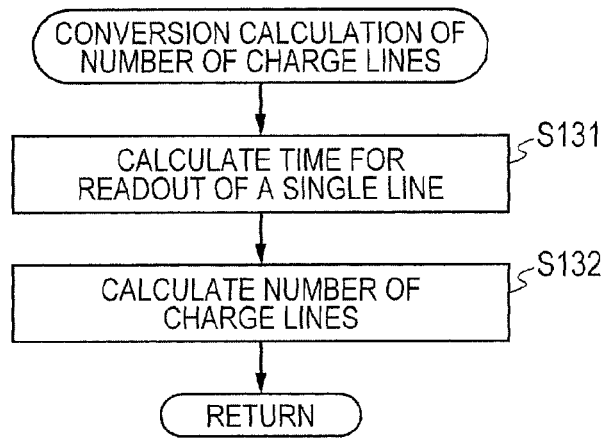
FIG. 7 is a flowchart illustrating a subroutine of Step S130 of the readout processing illustrated in FIG. 6.

In Step S130, the charge controller (count number setter) 109 calculates conversion of the number of charge lines. FIG. 7 illustrates a subroutine of Step S130 illustrated in FIG. 6. First, in Step S131 illustrated in FIG. 7, time for readout of a single line is calculated. As described above referring to FIGS. 2 and 3, Treadline is time necessary for reading out pixel signals of a single line. The Treadline is time acquired by adding together time from inputting one-shot pulse to the control line LineShift until transferring pixel data of a readout object line by the control line TransferH, and readout time of the control line Hpulse. The time until transferring the pixel data of the readout object line by the control line TransferH may be stored as a fixed value in advance. For the readout time of the control line Hpulse, because of dependence on the number of readout pixels per line, time is calculated by adding predetermined overhead time to time acquired by multiplying readout pulse cycle time by the number of readout pixels per line. The readout pulse cycle may be fixed time defined according to specifications of the image sensor 101. Those fixed values may be stored in a memory (not shown) or in the sensor controller 102 or the charge controller 109. Returning to the flowchart illustrated in FIG. 7, after the time for reading out a single line is calculated in Step S131, the processing proceeds to Step S132.

In Step S132 illustrated in FIG. 7, the number of charge lines is calculated. The "number of charge lines" is a value calculated by dividing the charge time input in Step S120 by the readout time per line calculated in Step S131. After the charge time and the readout time per line have been provided, the charge time can be converted into a unit of the number of charge lines. Using the unit of the number of charge lines enables processing (controlling) of the charge time (shutter speed or exposure time) without any dependence on the number of readout pixels per line and the readout time. In other words, by instructing a readout start or a charge start (charge reset) and counting control pulses used for changing the object line to a next line, the readout start, the charge start, and the charge time can be controlled in synchronization. The number of charge lines is necessary to be an integer in order to use the number of charge lines for control, and a value after a decimal point may be truncated or rounded off. According to the present invention, control is carried out by using the number of charge lines (count) of the integer thus rounded as a value corresponding to the charge time input by the charge time setter 400. In view of extremely short readout time per line with respect to the charge time (shutter speed) and an interval normally settable as the charge time, the number of charge lines acquired by the rounding processing and the set charge time can be said to be values satisfactory enough for the control. After the execution of Step S132, the subroutine illustrated in FIG. 7 is ended, and the processing proceeds to Step S140 illustrated in FIG. 6.

Figure 8:
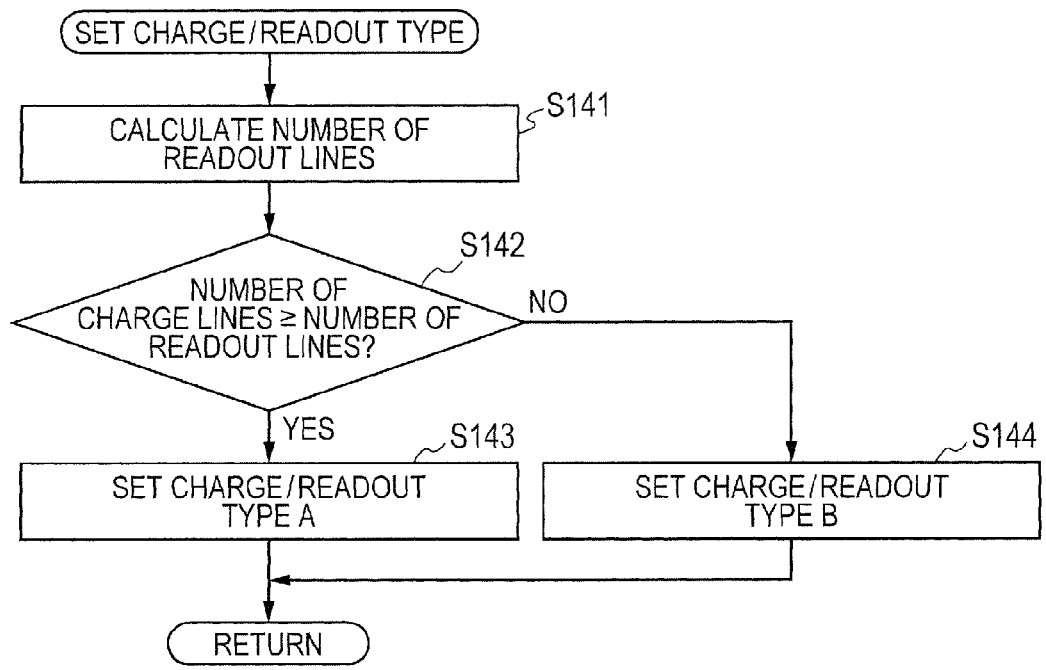
FIG. 8 is a flowchart illustrating a subroutine of Step S140 of the readout processing illustrated in FIG. 6.

In Step S140 illustrated in FIG. 6, a charge/readout type is set. FIG. 8 illustrates a subroutine of setting the charge/readout type in Step S140. First, in Step S141 illustrated in FIG. 8, the number of readout lines included in a range of an interest area (readout object) is calculated. According to this embodiment, as illustrated in FIG. 5, the readout object is 2,000 lines. Thus, in Step S141, the number of readout lines is 2,000.

After the execution of Step S141 illustrated in FIG. 8, the processing proceeds to Step S142. In Step S142, sizes are compared between the number of charge lines calculated in Step S132 and the number of readout lines calculated in Step S141. An evaluation expression in Step S142 is equivalent to Conditional Expression (1a) acquired by dividing both sides of Expression (1) by the readout time Treadline per line.

Number of charge lines(=Tcharge/Treadline) number of readout lines(Tread/Treadline) (1a)

When the number of charge lines is equal to or more than the number of readout lines in Step S141, that is, the charge time is longer than the readout time in Expression (1), the determination in Step S142 is true, and the processing proceeds to Step S143. On the other hand, when the number of charge lines is less than the number of readout lines in Step S142, the processing proceeds to Step S144. The conditional expression having the false determination in Step S142 is equivalent to Conditional Expression (2a) of dividing both sides of Expression (2) by the Treadline.

Number of charge lines(=Tcharge/Treadline)<number of readout lines(Tread/Treadline) (2a)

In Step S143 illustrated in FIG. 8, a charge/readout type A is set. The charge/readout type A is similar to the charge/readout type described above referring to FIG. 3. After the end of readout from the readout object line of the image sensor, charging of the readout object line is started, and readout of a line next to the readout object line is started in the charge/readout type A. In Step S144, a charge/readout type B is set. The charge/readout type B is similar to the charge/readout type described above referring to FIG. 4. After the start of charging of the readout object line of the image sensor, the readout object line is read out from when charging of a line, which is after the number of charge lines from the readout object line, is started. After the execution of Step S143 or S144 illustrated in FIG. 8, the subroutine illustrated in FIG. 8 is ended, and the processing proceeds to Step S150 illustrated in FIG. 6.

Figure 9:
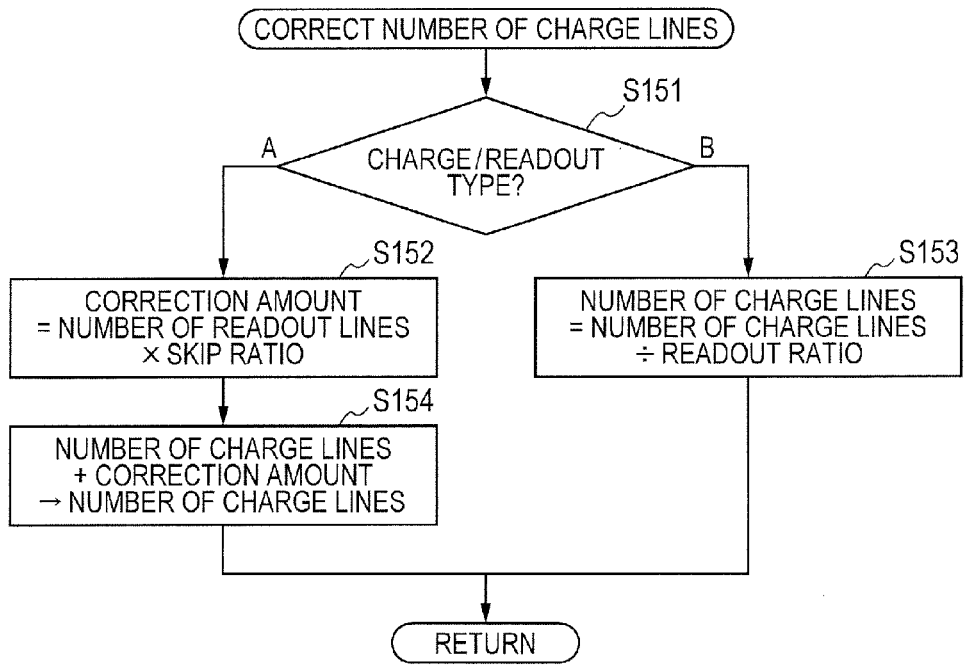
FIG. 9 is a flowchart illustrating a subroutine of Step S150 of the readout processing illustrated in FIG. 6.

In Step S150 illustrated in FIG. 6, correction processing of the number of charge lines is carried out. FIG. 9 illustrates a subroutine of Step S150. In FIG. 9, when the charge/readout type A is set in Step S151, the processing proceeds to Step S152. When the charge/readout type B is set in Step S151, the processing proceeds to Step S153.

In Step S152 illustrated in FIG. 9, as a correction amount of the number of charge lines, a value is calculated by multiplying the number of readout lines calculated in Step S141 by a skip ratio. The unit is a "line". The number of readout lines is 2,000 as illustrated in FIG. 5. The skip ratio can be calculated from the number of lines of a skip unit set in Step S110 illustrated in FIG. 6. The skip ratio is represented by Expression (3):

Skip ratio=1−1/(number of lines of a skip unit) (3)

The number of lines of a skip unit is "2" as described above. Thus, the skip ratio is "½". Accordingly, the correction amount set in Step S152 is calculated to be 1,000 through the calculation of 2,000×(½). After the execution of Step S152, the processing proceeds to Step S154. In Step S154, the correction amount is added to the number of charge lines to update the number of charge lines. For example, according to the example, the correction amount is 1,000. Thus, the correction amount of 1,000 lines is added to the number of charge lines 2,000, and the number of charge lines acquired after the correction is 3,000.

In Step S153 illustrated in FIG. 9, a value is calculated by dividing the number of charge lines calculated in Step S132 by a readout ratio, and the number of charge lines is updated as the corrected number of charge lines. The readout ratio can be calculated from Expression (4) or (5). When the number of lines of a skip unit used in the description of this embodiment is "2", the readout ratio is "½".

Readout ratio=1/(number of lines of a skip unit) (4)

Readout ratio=1−skip ratio (5)

A unit of the number of charge lines calculated in Step S153 illustrated in FIG. 9 is a "line" as in the case of Step S152. A condition for applying the charge/readout type B is that the number of charge lines is less than 2,000. As an example satisfying this condition, when the number of charge lines is 500, the corrected number of charge lines is acquired as 1,000 by division with the readout ratio "½".

After the execution of Step S153 or S154 illustrated in FIG. 9, the subroutine illustrated in FIG. 9 is ended, and the processing proceeds to Step S160 illustrated in FIG. 6.

Figure 10:
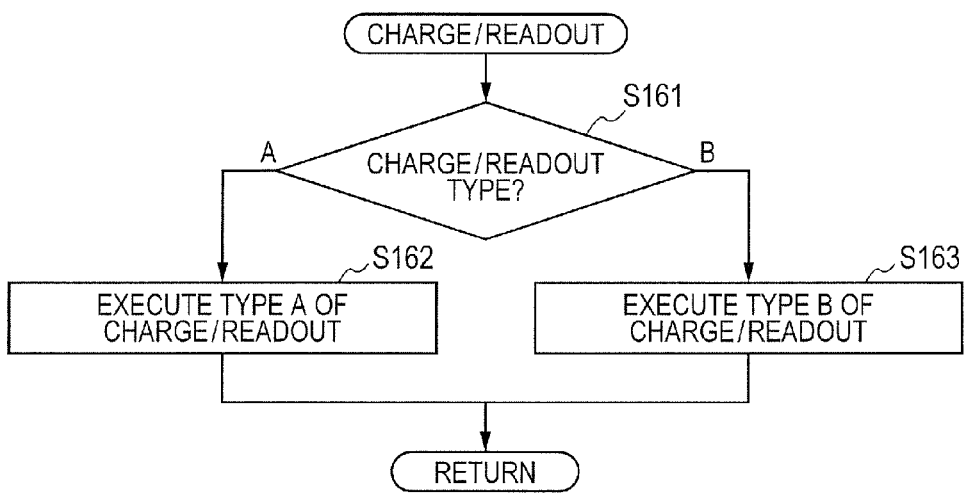
FIG. 10 is a flowchart illustrating a subroutine of Step S160 of the readout processing illustrated in FIG. 6.

In Step S160 illustrated in FIG. 6, charge/readout processing is carried out. FIG. 10 illustrates a subroutine of Step S160. In FIG. 10, the processing is carried out in order from Step S161. In Step S161 illustrated in FIG. 10, as in the case of Step S151 illustrated in FIG. 9, the charge/readout type set in Step S143 or S144 is evaluated. When the charge/readout type A is set, the processing proceeds to Step S162. When the charge/readout type B is set, the processing proceeds to Step S163.

Step S162 illustrated in FIG. 10 is described. In Step S162, image pickup processing of the charge/readout type A is carried out. The image pickup processing of the charge/readout type A is described referring to FIG. 11.

Figure 11:
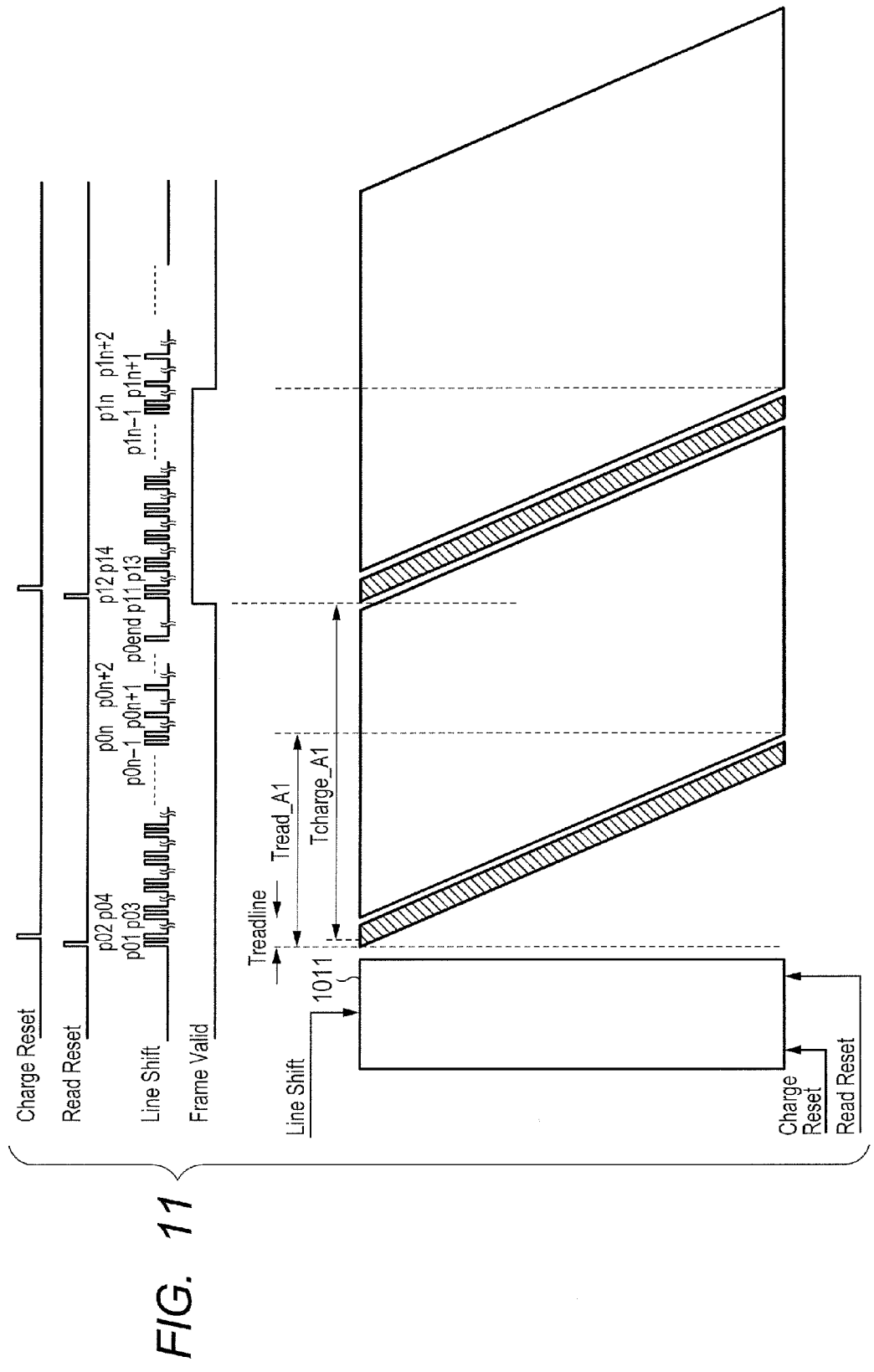
FIG. 11 is a timing chart illustrating a charge/readout type A in the image pickup apparatus according to the first embodiment.

In FIG. 11, as in the case illustrated in FIG. 3, the control lines ChargeReset, ReadReset, and LineShift are connected to the vertical circuit 1011, and a timing chart is illustrated in the upper part. Step S162 illustrated in FIG. 10, that is, an example of image pickup control of the image sensor 101 including 2,000 lines is described in FIG. 11. The example is described based on the setting that the number of lines of a skip unit is "2" as set in Step S110 illustrated in FIG. 6 and the number of charge lines is 3,000 as calculated in Step S154.

In FIG. 11, first, by inputting one-shot pulses to the control lines ReadReset and LineShift at a time p01, a first line of the image sensor 101 is started to be read out. Immediately after the input of the one-shot pulse to the control line LineShift at the time p01, namely at a time p02, one-shot pulses are input to the control lines LineShift and ChargeReset.

In the example illustrated in FIG. 3, after the input of the pulse to the control line LineShift at the time p01, the pixel signal of the first line is read out. However, in FIG. 11, at the time p01 and the time p02, the processing proceeds to selection of a second line without reading out the first line. In other words, the first line is skipped. After the input of the pulse to the control line LineShift at the time p02, the second line of the image sensor 101 is started to be read out.

As in the case illustrated in FIG. 3, a pixel signal of the second line is read out by using the control lines TransferH and Hpulse of the horizontal circuit 1012 (not shown). As in the case described above referring to FIG. 3, during the readout of the pixel signal, AD conversion is carried out by the ADC 103 illustrated in FIG. 1 in synchronization with the control line Hpulse. After readout of the pixel signal of the second line is ended, at a next time p03, as in the case at the time p01, a one-shot pulse is input to the control line LineShift. At a time p04 immediately thereafter, as in the case at the time p02, a one-shot pulse is input to the control line LineShift, and readout of the fourth line is carried out. Thus, in FIG. 11, readout of even lines is carried out while odd lines of the image sensor 101 are skipped.

Treadline illustrated in FIG. 11 indicates time necessary for reading out a pixel signal of a single line. In FIG. 11, a period of time from the time p01 to the time p02 is sufficiently short, and the combined skipping time and readout time by the two-line unit is equal to the Treadline illustrated in FIG. 3. When those are generalized for n readout lines, from a time p$0n-1$ to a time p$0n$, even lines are read out while odd lines are skipped. In the example of this embodiment, because of the use of the image sensor 101 including 2,000 lines, n=2,000 is set. At a time n and thereafter, pulses are input to the control line LineShift at a Treadline interval as in the case illustrated in FIG. 3. The pulses are continuously output to the control line LineShift at the fixed Treadline interval at the time n and thereafter. It is because time of lines continuously subjected to charging is managed based on the count of pulses output to the control line LineShift, and this necessitates continuous outputting of the pulses at the fixed interval. When pulses are input to the control line LineShift until a time p0end, at a time p11 and thereafter, as in the above-mentioned case, even lines are read out while odd lines are skipped. The "end" of the time p0end indicates the number of charge lines. For example, in the example set in Step S154 illustrated in FIG. 9, end=3,000 is set because the number of charge lines after correction is 3,000. When one-shot pulses to the control line LineShift are counted, and the count reaches the number of charge lines, charging of an amount equal to the time is carried out in the image sensor 101.

In FIG. 11, readout time Tread_A1 of pixel signals equivalent to 2,000 lines is ½ of the Tread_A shown in FIG. 3, that is, readout time of 1,000 lines, because skip and readout processing by the two-line unit is carried out as described above. The number of charge lines to each line becomes shorter by 1,000 lines because the readout time becomes ½. Specifically, while the time equivalent to the number of charge lines 2,000 (input charge time) is secured at the time p$0n$ in FIG. 3, in FIG. 11, the number of charge lines is 1,000 at the first line at the time p$0n$. In other words, at the time p$0n$, the pulses to the control line LineShift are counted by 2,000 times equivalent to the total number of lines. In real time, however, because of the skipping readout, time equivalent to Treadline×1,000 has passed. Accordingly, further charging is necessary for the time equivalent to Treadline×1,000 in real time from the time p$0n$. Thus, as corrected in Step S154 illustrated in FIG. 9, charging is additionally carried out for time equivalent to the remaining number of charge lines 1,000 until the time p0end. As a result, image pickup control is carried out so that the charge time Tcharge_A illustrated in FIG. 3 and the charge time Tcharge_A1 illustrated in FIG. 11 are equal to each other in real time. In other words, in order to read out lines to be read out by the skipping readout at the fixed time interval within the readout object range, pulses are input to the control line LineShift within negligible short time with respect to the 1,000 lines to be skipped. Thus, for the charge time managed based on the count of pulses to the same control line LineShift, the number of charge lines (charge time) needs to be corrected by time (Treadline×1,000) corresponding to the skipped 1,000 lines. The corrected number of charge lines is calculated in Step S154. This correction prevents the skip readout condition from affecting substantial charge time in the charge/readout type A to change.

In FIG. 11, the charge time as real time is reduced by an amount equal to the number of skipped lines as described above. Thus, by adding a correction amount to the number of charge lines as illustrated in FIG. 9, the charge time as real time is set equal between when there is skip setting and when there is no skip setting.

Returning to the flowchart illustrated in FIG. 10, in Step S163, image pickup processing of the charge/readout type B is carried out. The image pickup processing of the charge/readout type B is described referring to FIG. 12.

Figure 12:
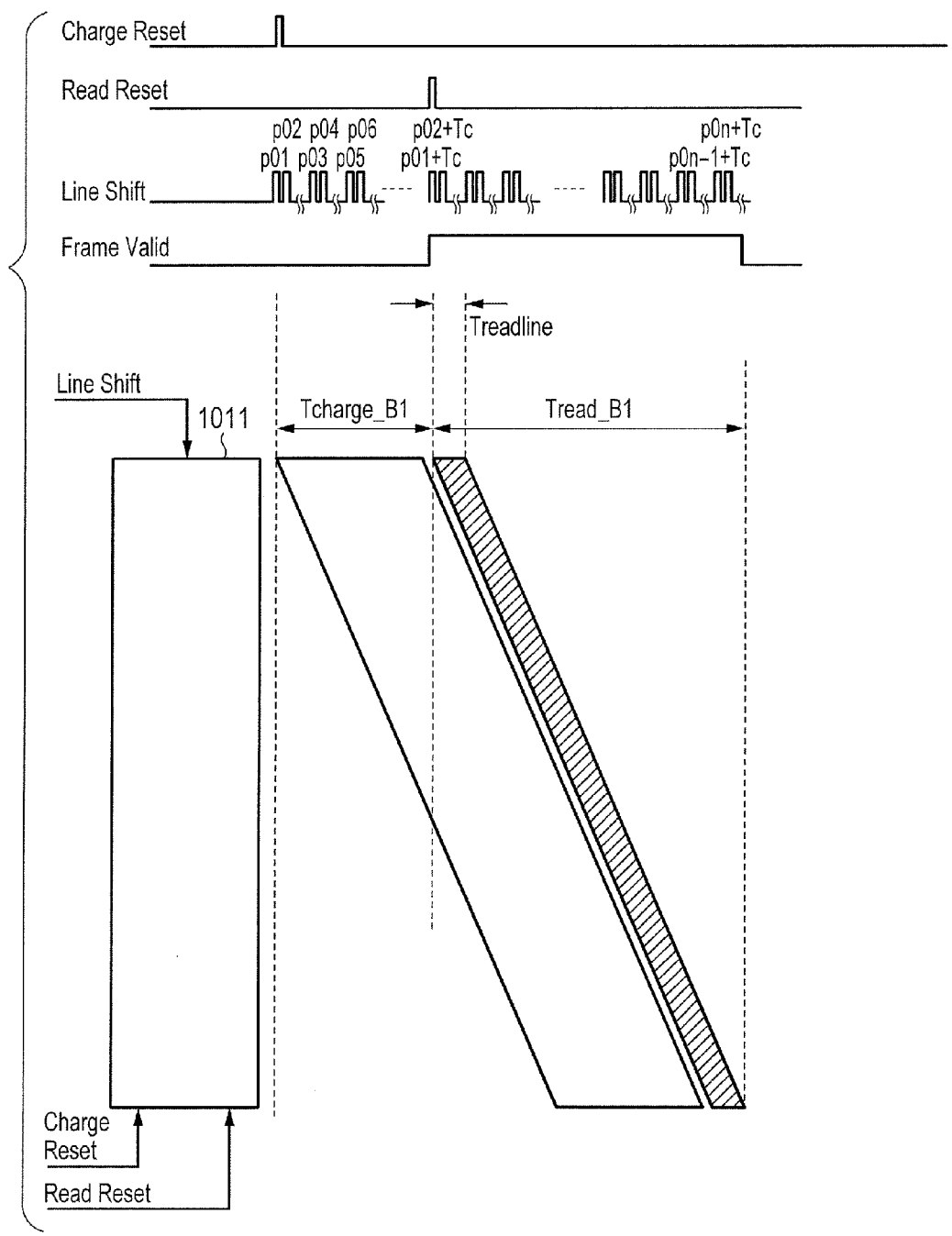
FIG. 12 is a timing chart illustrating a charge/readout type B in the image pickup apparatus according to the first embodiment.

In FIG. 12, as in the case illustrated in FIG. 11, the control lines ChargeReset, ReadReset, and LineShift are connected to the vertical circuit 1011, and a timing chart is illustrated in the upper part. An example of image pickup control of the image sensor 101 including 2,000 lines is described based on the setting that the number of lines of a skip unit is "2" as set in Step S110 illustrated in FIG. 6 and the number of charge lines is 1,000 as calculated in Step S153 illustrated in FIG. 9.

In FIG. 12, first, by inputting one-shot pulses to the control lines ChargeReset and LineShift at a time p01, a first line of the image sensor 101 is started to be read out. Immediately after the input of the one-shot pulse to the control line LineShift at the time p01 (after charge start of first line), namely at a time p02, a one-shot pulse is input to the control line LineShift. In this case, charging of the second line of the image sensor 101 is started. As in the case of the time interval between the time p01 and the time p02 illustrated in FIG. 11, an interval between the time p01 and the time p02 illustrated in FIG. 12 is sufficiently shorter than the time interval Treadline. After the input of the pulse to the control line LineShift at the time p02, one-shot pulses are input to the control line LineShift at a time p03 and a time p04. A time interval from the time p01 to the time p03 is Treadline. Similarly, one-shot pulses are input to the control line LineShift. When one-shot pulses are input to each of the control lines ReadReset and LineShift at a time p01+Tc, image signal readout is started from the first line of the image sensor 101. Tc indicates the number of charge lines calculated in Step S153 illustrated in FIG. 9, and is specifically 1,000 lines. In other words, after the start of charging of a predetermined readout object line of the image sensor, the predetermined readout object line is read out from when charging of a line, which is after the number of charge lines (count) from the predetermined readout object line, is started.

By inputting a one-shot pulse to the control line LineShift at a time p02+Tc immediately after the input of the one-shot pulse at the time p01+Tc, the processing proceeds to selection of the second line without reading out the first line. In other words, the first line is skipped, and after the input of the pulse to the control line LineShift at the time p02, the second line of the image sensor 101 is started to be read out. As in the case illustrated in FIG. 3, a pixel signal of the second line is read out by using the control lines TransferH and Hpulse of the horizontal circuit 1012 (not shown). As in the case described above referring to FIG. 3, during the readout of the pixel signal, AD conversion is carried out by the ADC 103 illustrated in FIG. 1 in synchronization with the control line Hpulse. Thereafter, similarly, image signal readout is carried out.

In FIG. 12, a period of time from the time p01+Tc to the time p02+Tc is sufficiently short as in the case illustrated in FIG. 11, and the combined skipping time and readout time by the two-line unit is equal to the Treadline illustrated in FIG. 3. When those are generalized for n readout lines, from the time p01 to the times p0n−1+Tc and P0n+Tc, even lines are read out while odd lines are skipped. In the example of this embodiment, the number of lines of the image sensor 101 is set to n=2,000 as in the case illustrated in FIG. 11.

In FIG. 12, the charge time Tcharge_B is Tc when converted into the number of charge lines, namely, 1,000 lines. Through the skipping and readout processing by the two-line unit, the charge time as real time is halved to 500 lines, which are equal to the charge time input in Step S110 illustrated in FIG. 6 as a result. In other words, a photographing image equal to a desired exposure level input by the user is captured. Through the skipping and readout processing by the two-line unit, Tread_B illustrated in FIG. 12 is ½ of the Tread_A and the Tread_B illustrated in FIGS. 3 and 4, that is, readout time of 1,000 lines. In the charge/readout type B, the charge time is shorter than the readout time for all the lines within the readout object range. Accordingly, when skipping readout is set, a pulse to the control line LineShift as a criterion for determining the charge time is output at a Treadline interval only at a timing of reading out a readout line, and is output at a negligibly short interval at line skipping timing. Thus, in order to maintain constant charge time irrespective of presence of skipping readout, the number of charge lines needs to be corrected by a readout ratio, and this is calculated in Step S153. This correction prevents the skip readout condition from affecting substantial charge time in the charge/readout type B to change.

According to this embodiment, the number of charge lines is calculated based on the readout time per line of the image sensor 101. The number of charge lines is then corrected based on the skipping set in Step S110 illustrated in FIG. 6, and the image pickup control of the image sensor 101 is carried out according to the corrected number of charge lines. Thus, the image pickup control is carried out so as to achieve the charge time equal to that desired by the user and set in Step S120 illustrated in FIG. 6. The example of carrying out the image pickup control by switching the two types of image pickup control based on the relationship between the charge time set in Step S120 illustrated in FIG. 6 and the number of readout lines of the image sensor 101 has been described. Thus, even when skip setting is changed, exposure of the captured image is equal between before and after the setting.

Second Embodiment

The first embodiment has been described by way of example of carrying out the image pickup control by switching the two types of image pickup control based on the relationship between the set charge time and the number of readout lines of the image sensor 101. Of the two types, in the image pickup control based on the condition of Expression (2), the number of charge lines is corrected based on the correction expression in Step S153 illustrated in FIG. 9. Then, based on the corrected number of charge lines, the image pickup control illustrated in FIG. 12 is carried out based on the same condition of Expression (2). The number of charge lines calculated in Step S153 illustrated in FIG. 9 is determined based on the skip ratio or the readout ratio as described above. However, when the skip ratio is high (readout ratio is low), the corrected number of charge lines may be greater. In other words, the following may hold true by correction carried out in view of the skip ratio:

$$\text{Number of charge lines}(=T\text{charge}/T\text{readline}) \text{ number of readout lines}(T\text{read}/T\text{readline}) \qquad (1a)$$

Thus, this embodiment describes an image pickup control method capable of optimally capturing images even under such a condition.

A configuration of an image pickup apparatus and a configuration of an image sensor 101 according to this embodiment are as illustrated in FIGS. 1 and 2. Those configurations are similar to those of the first embodiment, and thus description thereof is omitted.

Figure 13:
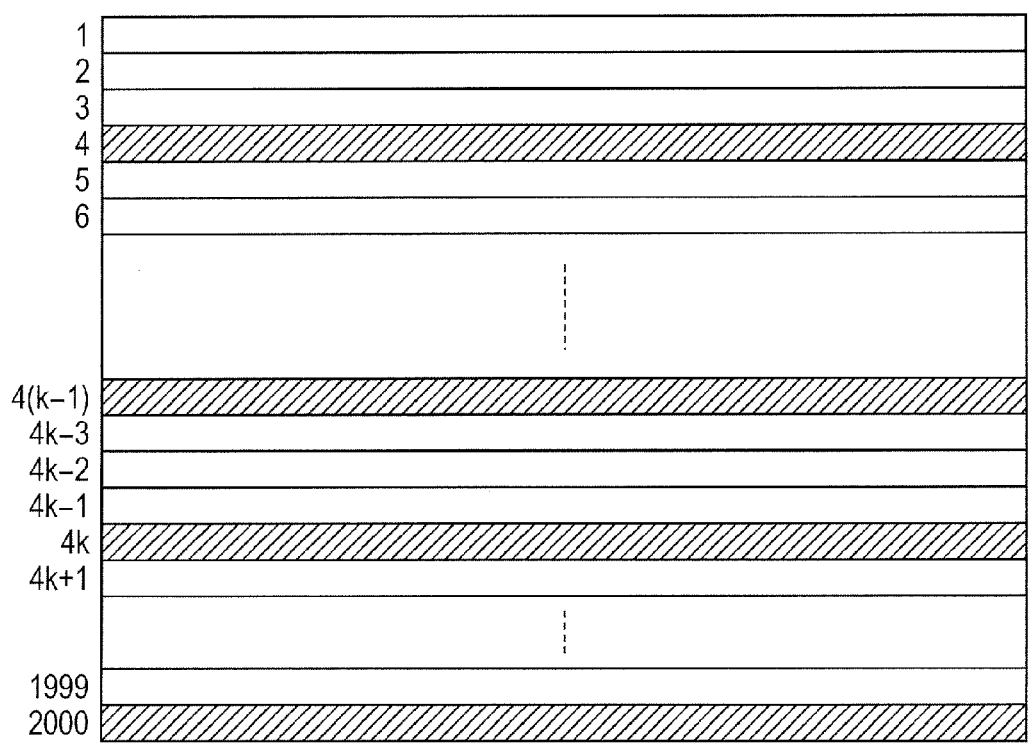
FIG. 13 is a diagram illustrating a setting example of a readout object line in an image pickup element according to a second embodiment of the present invention.
Figure 14:
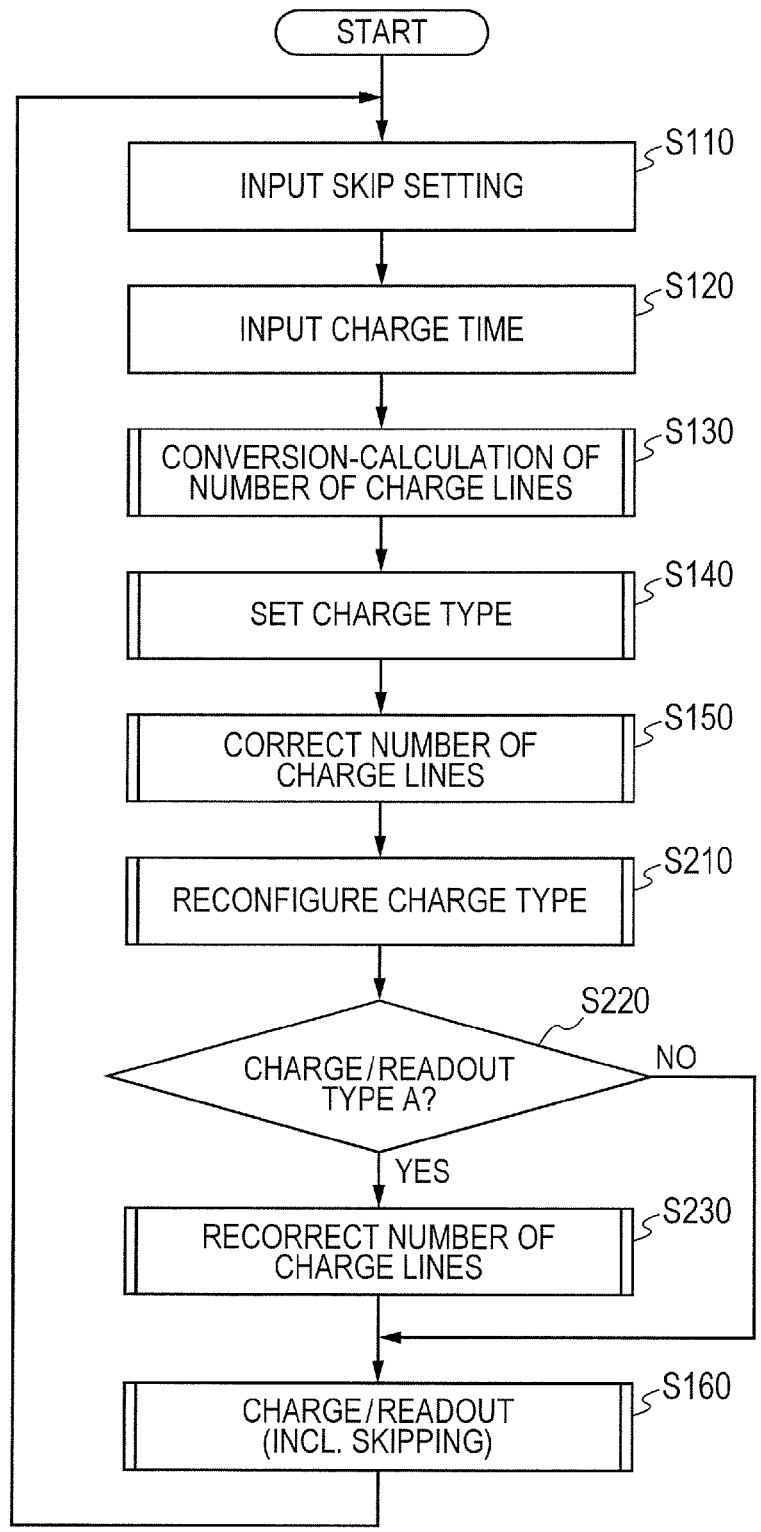
FIG. 14 is a flowchart illustrating readout processing of an image pickup apparatus according to the second embodiment.

In this embodiment, an image pickup example under a condition that a skip ratio is higher than that of the first embodiment is described. FIG. 13 illustrates an example where the image sensor 101 includes 2,000 lines of image pickup elements. In this embodiment, an example is described where exposure levels (charge time) are set equal between when 2,000 lines illustrated in FIG. 13 are read out and when only a 4k-th line (k is natural number) of a shaded part is selected to be read out. Further, a description is given of an example of carrying out optimal pickup control by switching a type of image pickup control when the corrected number of charge lines is greater. FIG. 14 is a flowchart illustrating processing carried out by the image pickup apparatus 100 according to this embodiment. When power is turned ON for the image pickup apparatus 100, the processing is carried out in order from Step S110 illustrated in FIG. 14.

The processing from Steps S110 to S150 in the flowchart illustrated in FIG. 14 is similar to that of the first embodiment, and thus detailed description thereof is omitted. In this embodiment, an example where "4" is input as a setting value in Step S110 illustrated in FIG. 14 is described. A case where the number of charge lines is calculated to be 800 in Step S130 illustrated in FIG. 14 is described as an example. The charge/readout type B is selected in Step S140. Thus, in Step S150, the processing proceeds to Step S153 illustrated in FIG. 9. The skip setting value set in Step S110 illustrated in FIG. 14 is "4", and accordingly a readout ratio in Step S153 illustrated in FIG. 9 is "¼" based on Expression (4). As a result, the number of charge lines is quadrupled to be 3,200.

Figure 15:
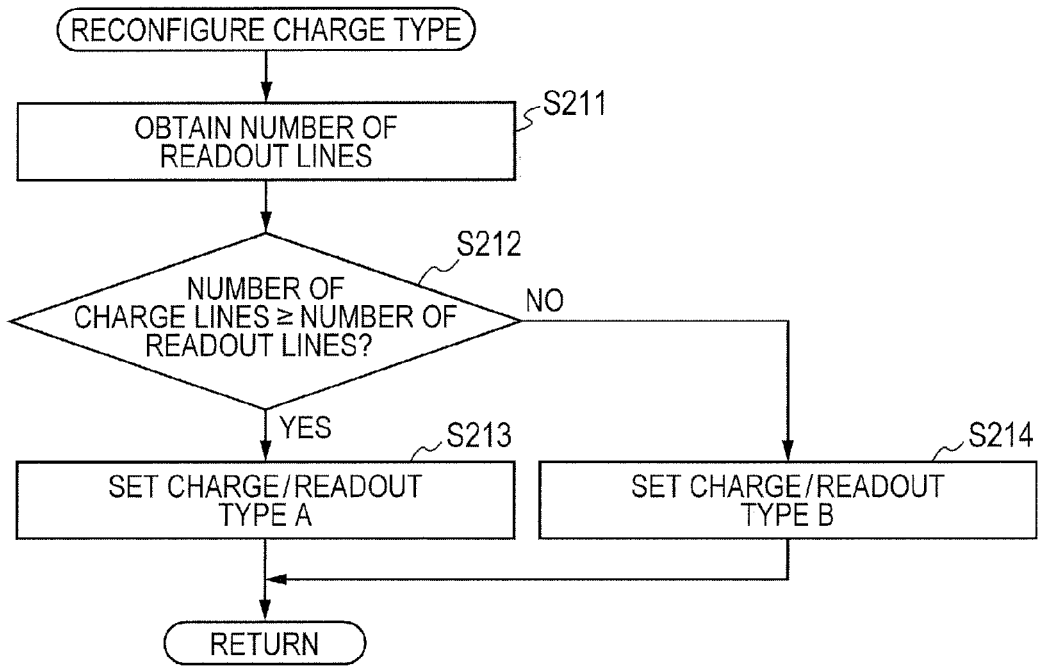
FIG. 15 is a flowchart illustrating a subroutine of Step S210 of the readout processing illustrated in FIG. 14.

Returning to FIG. 14, after Step S150 has been carried out, the processing proceeds to Step S210. In Step S210, a charge type is reconfigured. FIG. 15 illustrates a subroutine of Step S210.

In FIG. 15, first, Step S211 is carried out. In Step S211, the number of readout lines that is the number of lines included in a readout object area is acquired. In this case, as in the case of Step S141 illustrated in FIG. 8, the number of readout lines, namely 2,000, of the image sensor 101 is acquired. After the execution of Step S211 illustrated in FIG. 15, the processing proceeds to Step S212. In Step S212, sizes are compared between the number of charge lines corrected in Step S150 illustrated in FIG. 14 and the number of readout lines. When the number of charge lines is equal to or more than the number of readout lines, the processing proceeds to Step S213. In Step S213, the charge/readout type A is set. When the number of charge lines is less than the number of readout lines, the processing proceeds to Step S214. In Step S214, the charge/readout type B is set.

In FIG. 15, in the setting example according to this embodiment, the number of charge lines corrected in Step S150 illustrated in FIG. 14 is 3,200, and the number of readout lines is 2,000. In this case, the determination is true in Step S212, and the processing proceeds to Step S213 to set the charge/readout type A. In the case of an example where the skip setting is "2", the number of charge lines corrected in Step S150 illustrated in FIG. 14 is 1,600. In this case, the number of readout lines is less than 2,000, and hence the processing proceeds to Step S214 to set the charge/readout type B. After the execution of Step S213 or S214, the subroutine illustrated in FIG. 15 is ended, and the processing proceeds again to Step S220 illustrated in FIG. 14.

In Step S220 illustrated in FIG. 14, whether the charge/readout type reconfigured in Step S210 is A or not is determined. When true, the processing proceeds to Step S230. When false, the processing proceeds to Step S160. In the setting example according to this embodiment, the charge/readout type A is set as described above. Thus, the processing proceeds to Step S230.

Figure 16:
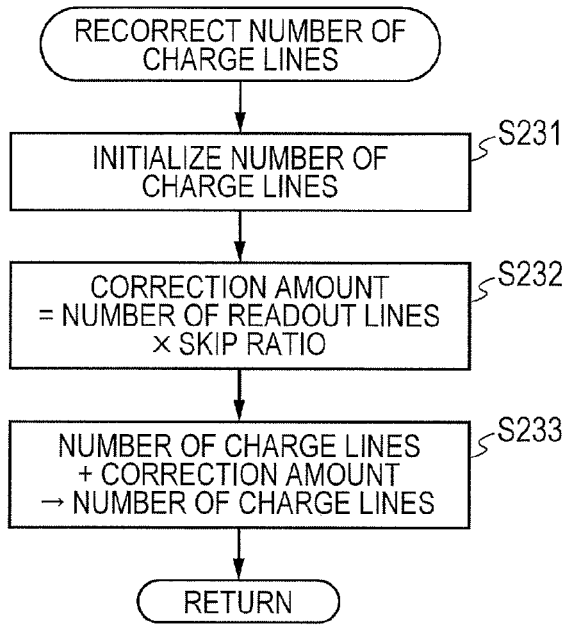
FIG. 16 is a flowchart illustrating a subroutine of Step S230 of the readout processing illustrated in FIG. 14.

In Step S230 illustrated in FIG. 14, the number of charge lines is recorrected. The number of charge lines until Step S230 is carried out is the number calculated in Step S150 based on the charge type set in Step S140. When the charge/readout type is changed due to the reconfiguration of the charge type in Step S210, the number of charge lines needs to be set again in accordance with the charge/readout type to be subjected to last image pickup control. The method of this embodiment is particularly effective under a condition that image pickup control is enabled in the charge/readout type A as a result of correcting the number of charge lines by skip setting although the original type is the charge/readout type B. FIG. 16 illustrates a subroutine of Step S230 illustrated in FIG. 14.

In FIG. 16, first, in Step S231, the number of charge lines is initialized. Here, the number of charge lines calculated in Step S130 illustrated in FIG. 14 is set. After the execution of Step S231, the processing proceeds to Step S232 to calculate a correction amount. The processing in Step S232 is the same as that in Step S152 illustrated in FIG. 9 of the first embodiment. A correction amount of the number of charge lines is acquired by multiplying the number of readout lines by a skip ratio. In the setting example according to this embodiment, the number of readout lines is 2,000 as described above, and the skip ratio is "¾". Accordingly, the correction amount of the number of charge lines is 1,500 lines. After the execution of Step S232 illustrated in FIG. 16, the processing proceeds to Step S233 to add the correction amount to the set number of charge lines. Thus, the corrected number of charge lines can be acquired. In the setting example according to this embodiment, the correction amount of 1,500 lines is added to the number of charge lines, namely 800 lines, calculated in Step S130 illustrated in FIG. 14. Accordingly, 2,300 lines are acquired as the corrected number of charge lines. After the execution of Step S233, the subroutine illustrated in FIG. 16 is ended, and the processing proceeds to Step S160 illustrated in FIG. 14.

Comparison in Step S214 is equivalent to comparison of time necessary for reading the number of readout lines in view of skipping with set charge time. When skipping is considered, the time necessary for reading the number of readout lines is shorter. Accordingly, no change occurs in a state of the charge/readout type A. However, in a state of the charge/readout type B, it may be desired to change the state to the charge/readout type A. Thus, when a state after consideration of skipping is a condition of the charge/readout type B, there is no need to change the method for calculating the number of charge lines. Thus, no reviewing is necessary for correcting the number of charge lines. However, when the state after consideration of skipping is a condition of the charge/readout type A, a case where the charge/readout type B has been changed to the charge/readout type A in view of skipping is included. Thus, correction of the number of charge lines needs to be reviewed in order to correctly evaluate the number of charge lines. Accordingly, Step S230 is carried out.

The processing carried out in Step S160 illustrated in FIG. 14 is as described above referring to FIG. 10 of the first embodiment. In the setting example according to this embodiment, image pickup control is carried out by the charge/readout type A reconfigured in Step S210. Image pickup processing of the charge/readout type A in this case is described referring to FIG. 17.

Figure 17:
FIG. 17 is a timing chart illustrating a charge/readout type A in the image pickup apparatus according to the second embodiment.

FIG. 17 illustrates image pickup control in which a skip ratio is "¼". At a time p01, one-shot pulses are input to the control lines LineShift and ReadReset to start readout of a first line of the image sensor 101. At a time p02 immediately after the time p01, by inputting one-shot pulses to the control lines ChargeReset and LineShift, readout of a second line and charging of the first line of the image sensor 101 are started. Similarly, by continuously inputting one-shot pulses to the control line LineShift at a time p03 and a time p04 (not shown) immediately after the time p02, image pickup control is carried out by the four-line unit. As in the case described above referring to FIG. 10, n=2,000 is set and, when readout from a time p0n−3 to a time p0n (not shown) is ended, one-shot pulses are input to the control line LineShift at a time interval of Treadline from a time p0n+1 to the time p0end. Because of the four-line unit image pickup control carried out from the time p01 to the time p0n, the 4k-th line (k is natural number) is read out while the three lines from 4k−3 to 4k−1 are skipped. In the above-mentioned example, end=2,300 is set for the time p0end.

In FIG. 17, readout time Tread_A2 of pixel signals equivalent to 2,000 lines is ¼ of the Tread_A illustrated in FIG. 3, that is, readout time of 500 lines as real time, because skip and readout processing by the four-line unit is carried out as described above. The number of charge lines for each line becomes shorter by 1,500 lines because the readout time becomes ¼. Specifically, in FIG. 17, at the time p0n (n=2,000), charge time of the first line as real time is equivalent to the number of charge lines, namely, 500 lines. Thus, as corrected in Step S154 illustrated in FIG. 9, charging is additionally carried out for time equivalent to the remaining number of charge lines 300 until the time p0end, namely, until the end=2,300 lines. As a result, image pickup control is carried out so that the charge time Tcharge_A illustrated in FIG. 3 and the charge time Tcharge_A1 illustrated in FIG. 11 are equal to each other in real time.

In FIG. 17, similarly to FIG. 11, the charge time as real time is reduced by an amount equal to the number of skipped lines. Thus, by correcting the number of charge lines as illustrated in FIG. 16, the charge time as real time is set equal between when there is skip setting and when there is no skip setting.

Figure 18:
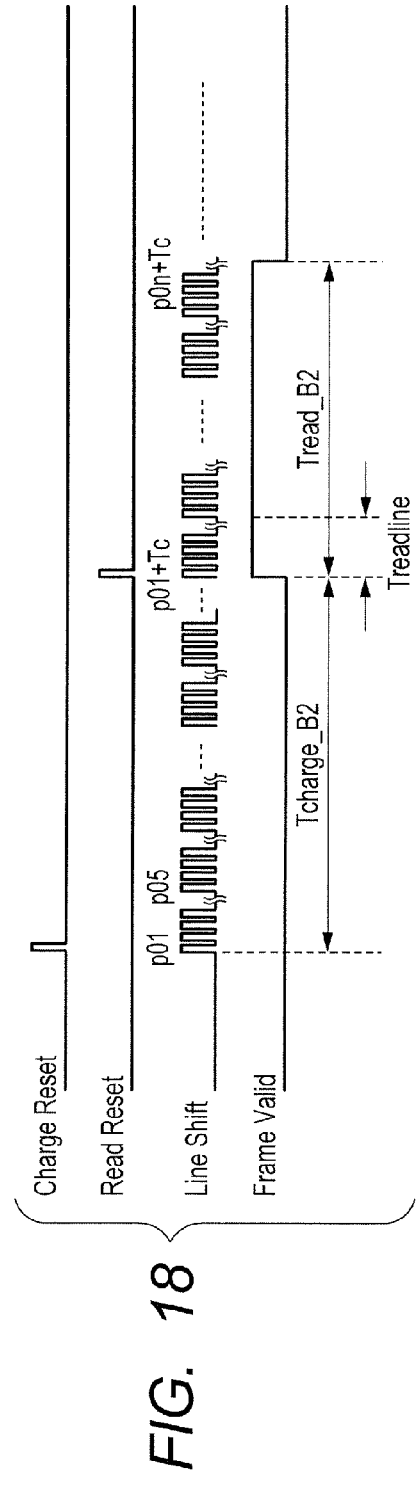
FIG. 18 is a timing chart illustrating a charge/readout type B in the image pickup apparatus according to the second embodiment.

Returning to Step S160 of the flowchart illustrated in FIG. 14, when the determination is false in Step S220, in Step S160, image pickup control based on the charge/readout type B illustrated in FIG. 18 is carried out. The image pickup control illustrated in FIG. 18 is similar to that described above except for a change of the two-line unit control illustrated in FIG. 12 to the four-line unit control.

Thus, according to this embodiment, when the number of charge lines corrected by skip setting is equal to or more than the number of readout lines, the state is switched to the charge/readout type A to recorrect the number of charge lines. Thus, by optimally switching the charge/readout type, exposure can be set equal irrespective of skip setting, and an image pickup updating cycle can be optimized.

This embodiment has been described by way of example where the number of lines to be read out is 1 with respect to the skip unit. However, the number of lines to be read out is not limited to 1. For example, in the case of a monochrome camera or a color camera including three image pickup elements, it is preferred to apply the arrangement of this embodiment. On the other hand, in the case of a color camera including a single image pickup element, consideration needs to be given to a Bayer array. In other words, when an image pickup element including a Bayer array in which one color is created over a plurality of lines is used, the number of lines to be read out may be 2 or more with respect to the skip unit.

In the description above, the integer (or integer rounded off or truncated) acquired by dividing the charge time (S120) by single-line readout time is set as the number of charge lines (S130), and the charge/readout type is set based on the size relationship between the number of charge lines and the number of readout lines (S140). Further, the number of charge lines is corrected in accordance with the set charge/readout type (S150), and the charge/readout type is reconfigured based on the size relationship between the corrected number of charge lines and the number of readout lines (S210), to thereby correct the number of charge lines (S220 and S230). This is a processing flow suitable when the apparatus includes hardware or software for reflecting a reconfigured skip condition as correction with respect to a predetermined base value. However, the present invention is not limited to this arrangement. For example, at the time of calculating the number of charge lines (S130), an integer acquired by dividing the input charge time (S120) by readout time per line within a readout object range, or a value rounded off or truncated to an integer may be calculated, and a value acquired by multiplying this by the number of lines of a skip unit may be set as the number of charge lines (corresponding to S130). In this case, even from the time p0n+1 to the time p0end illustrated in FIG. 11, as in the case from the time p01 to the time p0n, control is carried out so that pulses of the number of lines of a skip unit can be output within the readout time per line. Through this control, effects of the present invention similar to those provided by the control illustrated in FIG. 6 can be attained even without carrying out correction processing (for dealing with change from the charge/readout type B to A) of Steps S210 to S230 illustrated in FIG. 14.

Third Embodiment

The first and second embodiments have been described by way of example where the image pickup control is carried out with the predetermined skip ratio for the entire screen of the image sensor 101. This embodiment describes image pickup control where a part of interest areas of the image sensor 101 are extracted as readout object areas while other areas are skipped. Readout time per line is different between when the entire screen of the image sensor 101 is read out and when a part of interest areas are read out (when interest area is not over entire single line). Accordingly, following a setting change of a readout area, exposure of a photographing image may be changed in the case of control based on the assumption that readout time per line is constant. This embodiment describes an image pickup apparatus capable of setting exposure (charge time or shutter speed) equal even when a setting change of a readout area accompanied by a change in readout time per line occurs under such a photographing condition.

A configuration of the image pickup apparatus and a configuration of the image sensor 101 according to this embodiment are illustrated in FIGS. 1 and 2. Those configurations are similar to those of the first embodiment, and thus description thereof is omitted.

Figure 19:
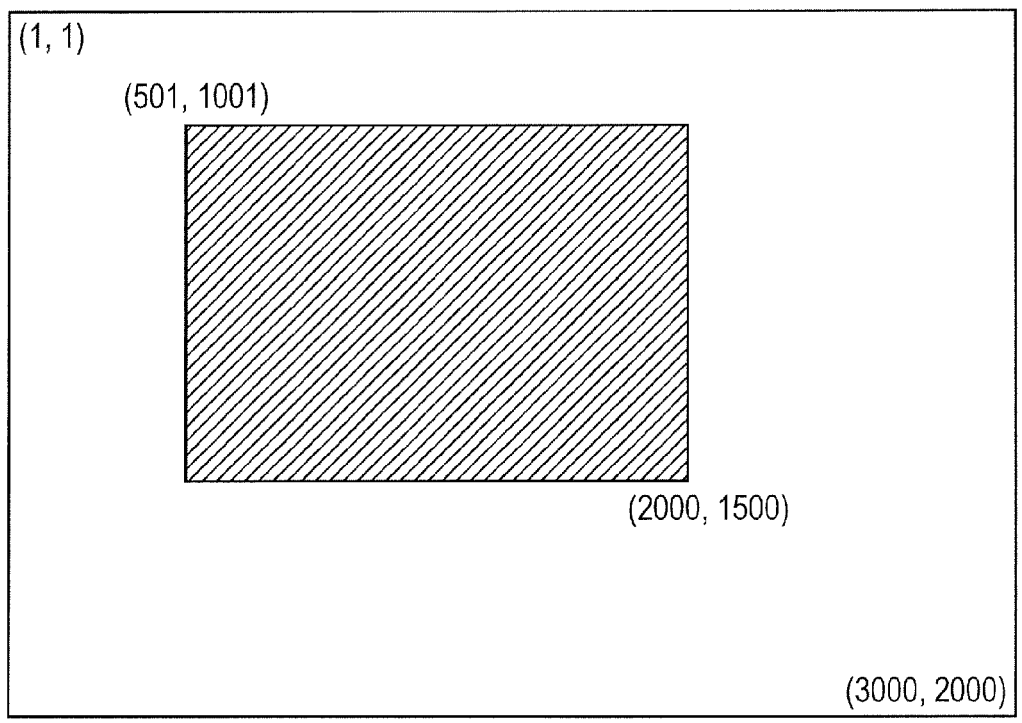
FIG. 19 is a diagram illustrating a setting example of a readout object area in an image pickup element of an image pickup apparatus according to a third embodiment of the present invention.
Figure 20:
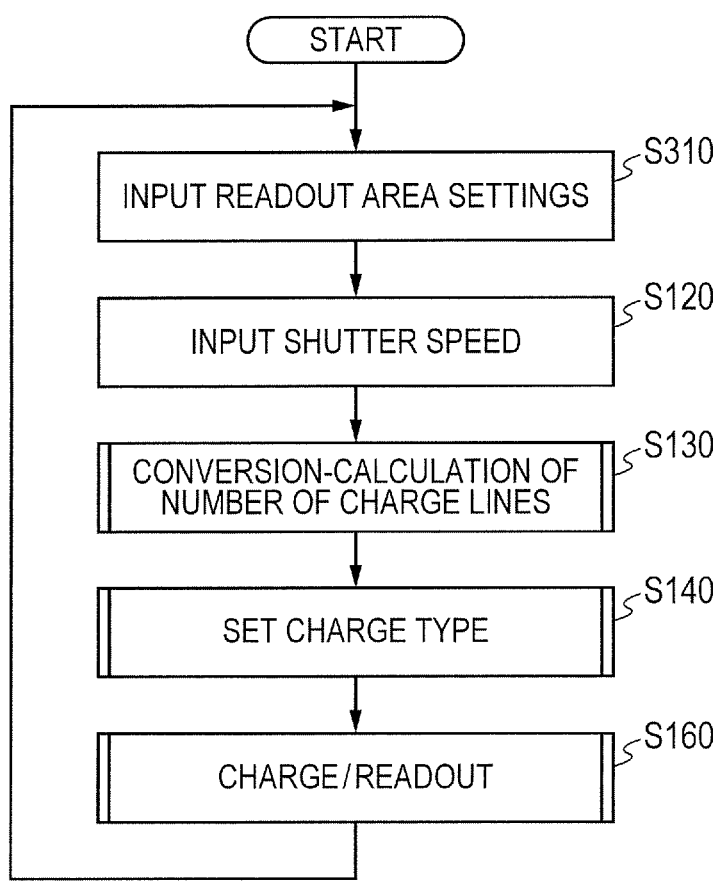
FIG. 20 is a flowchart illustrating readout processing of the image pickup apparatus according to the third embodiment.

In this embodiment, an image pickup example where one interest area of the image sensor 101 is set is described. FIG. 19 illustrates an example where the image sensor 101 includes image pickup elements of 2,000 lines. This embodiment is described by way of example where exposure levels are set equal between when all pixel signals are read out as illustrated in FIG. 19 and when only an interest area of a shaded part is read out. FIG. 20 is a flowchart illustrating processing of the image pickup apparatus 100 according to this embodiment. When power is turned ON for the image pickup apparatus 100, the processing is carried out in order from Step S310 illustrated in FIG. 20.

First, in Step S310 of the flowchart illustrated in FIG. 19, readout area setting is input. This setting is input through a readout condition input unit 107 by the readout condition setter 300 illustrated in FIG. 1. According to this embodiment, in order to read out the area of the shaded part illustrated in FIG. 19 as the readout area, start coordinates (X, Y) and end coordinates (X, Y) serving as coordinate information of the readout area are input as follows. In this case, the number of horizontal pixels of the readout area is 1,500. The number of vertical pixels of the readout area, that is, the number of lines is 500.

Start coordinates (501, 1001), end coordinates (2000, 1500)

A readout setting value is stored in the readout condition input unit 107 illustrated in FIG. 1, and input to a charge controller 109. After the execution of Step S310 illustrated in FIG. 20, the processing proceeds to Step S120.

In Step S120 illustrated in FIG. 20, charge time corresponding to a shutter speed is input as in the case of the first and second embodiments. After the execution of Step S120, the processing proceeds to Step S130.

In Step S130 illustrated in FIG. 20, as in the case of the first and second embodiments, the charge time set in Step S120 is converted by calculation into the number of charge lines in accordance with the definition described above. The readout time Treadline per line calculated in Step S131 illustrated in FIG. 7 according to the first and second embodiments is based on the assumption that all the pixel data of a single line are read. On the other hand, according to this embodiment, as illustrated in FIG. 19, the number of horizontal pixels of the readout object area is 1,000, which is ⅓ of all the pixels of 3,000 per line. As described above, readout time of a pixel signal by a control line Hpulse depends on the number of readout pixels per line. Thus, the readout time is about ⅓ of those of the first and second embodiments. In Step S132 illustrated in FIG. 7, the number of charge lines is calculated by dividing the charge time by the Treadline. Accordingly, the number of charge lines calculated in Step S132 is three times larger than those of the first and second embodiments. Thus, the readout time of the pixel signal per line may change depending on the size of the readout area input in Step S310. The number of charge lines changes due to the readout time per line and the size of the readout area. This is processing carried out to achieve the charge time input in Step S120 because the charge time is controlled based on the count of pulses to the control line LineShift in the image sensor. After the execution of Step S130 illustrated in FIG. 20, the processing proceeds to Step S140.

In Step S140 illustrated in FIG. 20, a charge type is set as in the case illustrated in FIG. 6. In this embodiment, the number of readout lines is 1,000 as illustrated in FIG. 19. Accordingly, in a determination expression implemented in Step S142 illustrated in FIG. 8, which is a subroutine of Step S140, based on a result of size comparison with the number of readout lines, namely, 1,000 lines, a charge/readout type A or B is selected. After the execution of Step S140, the processing proceeds to Step S160.

Figure 21:
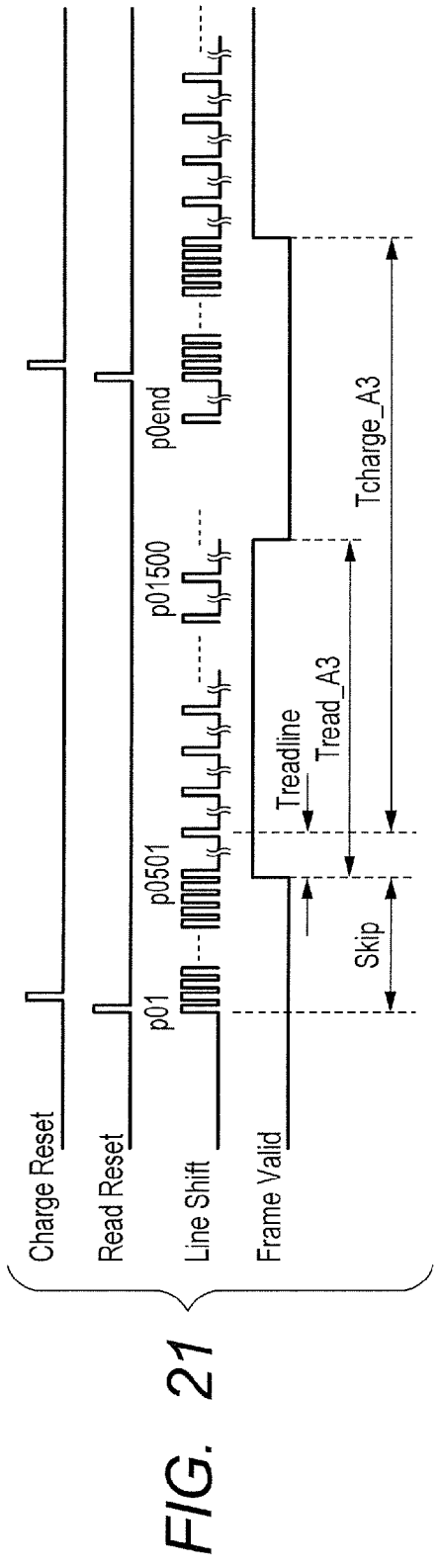
FIG. 21 is a timing chart illustrating a charge/readout type A in the image pickup apparatus according to the third embodiment.

In Step S160 illustrated in FIG. 20, image pickup control of the image sensor 101 is carried out. In Step S160, as described above, based on the result of the size comparison of the number of charge lines with the number of readout lines, the charge/readout type A or B is carried out. FIG. 21 illustrates a timing chart when the charge/readout type A is carried out. A specific setting example of charge time according to this embodiment is similar to those of the first and second embodiments, and thus description thereof is omitted.

In FIG. 21, first, by inputting one-shot pulses to the control lines LineShift and ReadReset at a time p01, a first line of the image sensor 101 is started to be read out. At a time p02 (not shown) immediately after the time p01, by inputting one-shot pulses to the control lines ChargeReset and LineShift, readout of a second line and charging of the first line are started. Similarly, by continuously inputting one-shot pulses to the control line LineShift until a time p0501, an illustrated skip area is skipped until the 501st line of the image sensor 101. At the time p0501 and thereafter, one-shot pulses are input to the control line LineShift at an interval of Treadline. In this embodiment, the Treadline is ⅓ of the time interval of Treadline of the first and second embodiments as described above in Step S130 illustrated in FIG. 20. The Treadline is calculated, after the readout area has been set in Step S310, to be stored in the charge controller 109. A period where Frame Valid illustrated in FIG. 21 is in an H state indicates readout timing of the area of the shaded part illustrated in FIG. 19, that is, the area set in Step S310 illustrated in FIG. 20. In the setting example according to this embodiment, the readout object area is from the 501st line to the 1,500th line in the image sensor 101. Time for reading out 1,000 readout object lines is indicated by Tread_A3 illustrated in FIG. 21. According to the setting example of this embodiment, the readout time Tread_A3 can be acquired by multiplying the 1,000 readout lines by the Treadline. At the time p01500 and thereafter, that is, after the readout processing up to the 1,500th line of the image sensor 101, one-shot pulses are input to the control line LineShift at an interval of Treadline. Then, after the input of one-shot pulses to the control line LineShift until a time p0end, processing similar to the readout processing at the time p01 and thereafter is carried out. The "end" of the time p0end indicates the number of charge lines. Tcharge_A3 illustrated in FIG. 21 is equal to the charge time set in Step S120 illustrated in FIG. 20. The Tcharge_A3 indicates time from the end of reading out the 501st line to the start of the next readout of the 501st line.

Figure 22:
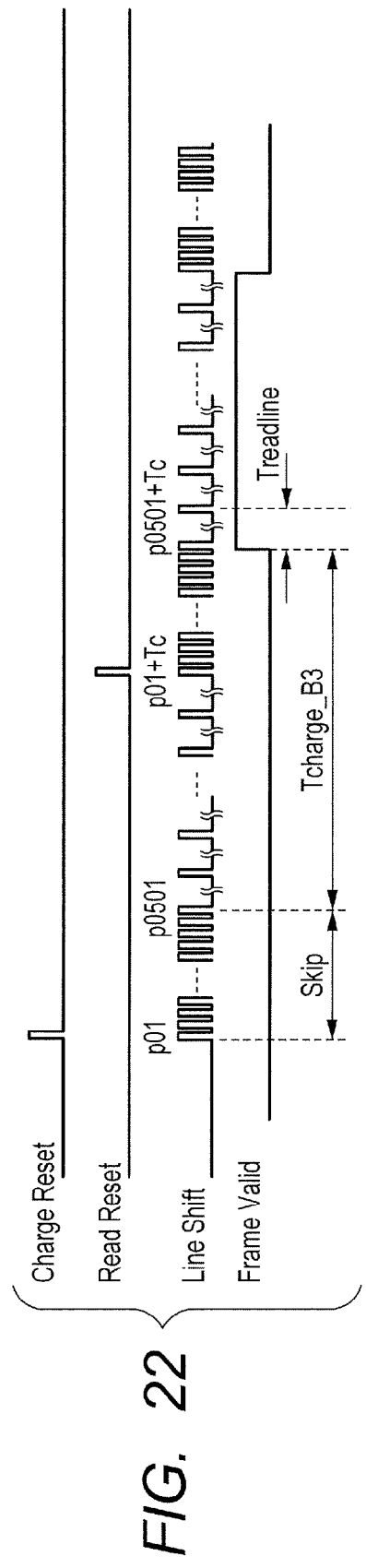
FIG. 22 is a timing chart illustrating a charge/readout type B in the image pickup apparatus according to the third embodiment.

FIG. 22 illustrates a timing chart when the charge/readout type B is carried out. In FIG. 22, first, by inputting one-shot pulses to the control lines LineShift and ChargeReset at a time p01, charging of the first line of the image sensor 101 is started. As in the case illustrated in FIG. 22, by continuously inputting one-shot pulses to the control line LineShift from the first line to the 501st line, charging of the first line to the 501st line is continuously started. At the time p0501 and thereafter, one-shot pulses are input to the control line LineShift at an interval of Treadline. After the input of the one-shot pulses equivalent to the time p01+Tc, that is, the number of charge lines Tc, a one-shot pulse is input to the control line ReadReset, and readout is started from the first line of the image sensor 101. As in the case described above, readout of the first line to the 500th line of the image sensor 101 can be skipped. As in the case illustrated in FIG. 21, Tcharge_B3 illustrated in FIG. 22 is equal to the charge time set in Step S120 illustrated in FIG. 20.

Thus, according to this embodiment, because of a setting size of the readout area, readout time of a pixel signal per line is shorter than that of the entire screen. Accordingly, by setting the number of charge lines based on the readout time per line, the set charge time can be equal. As a result, a change in exposure of an image can be reduced before and after setting of the readout area.

Figure 23:
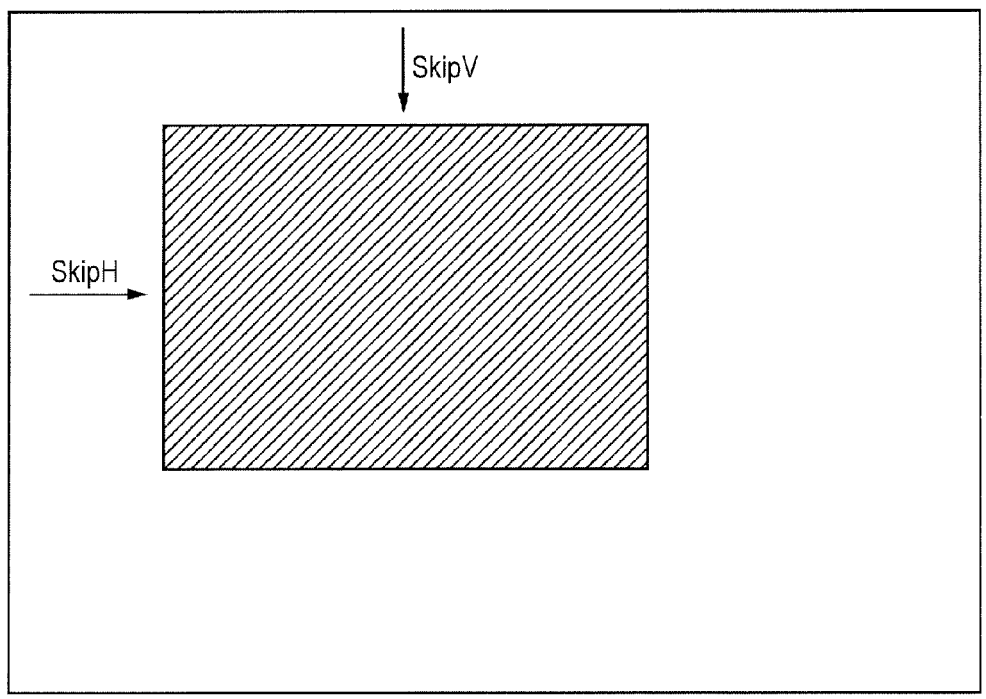
FIG. 23 is an explanatory diagram illustrating a skip area in the image pickup element according to the third embodiment.

FIGS. 21 and 22 of this embodiment illustrate the example of skipping the areas other than the readout area (FIG. 23). The skip processing time may be negligible when it is sufficiently shorter than the readout time per line. On the other hand, when the number of lines to be skipped is large, or the readout time Treadline per line is short, the skip processing time may not be negligible. In such a case, during calculation of the number of charge lines, it is desired to calculate the number of charge lines in view of the skip processing time.

Fourth Embodiment

In the third embodiment, the image pickup control has been described where a part of interest areas of the image sensor 101 are read out while the other areas are skipped. However, when a plurality of interest areas is extracted and skipping is carried out among the interest areas, exposure of the other interest areas may be changed due to characteristics of the image pickup control. Thus, this embodiment describes an image pickup apparatus capable of setting exposure (charge time or shutter speed) equal before and after the readout area setting is changed under a photographing condition where a plurality of interest areas are set.

A configuration of the image pickup apparatus and a configuration of an image sensor 101 according to this embodiment are illustrated in FIGS. 1 and 2. Those configurations are similar to those of the first embodiment, and thus description thereof is omitted.

Figure 24:
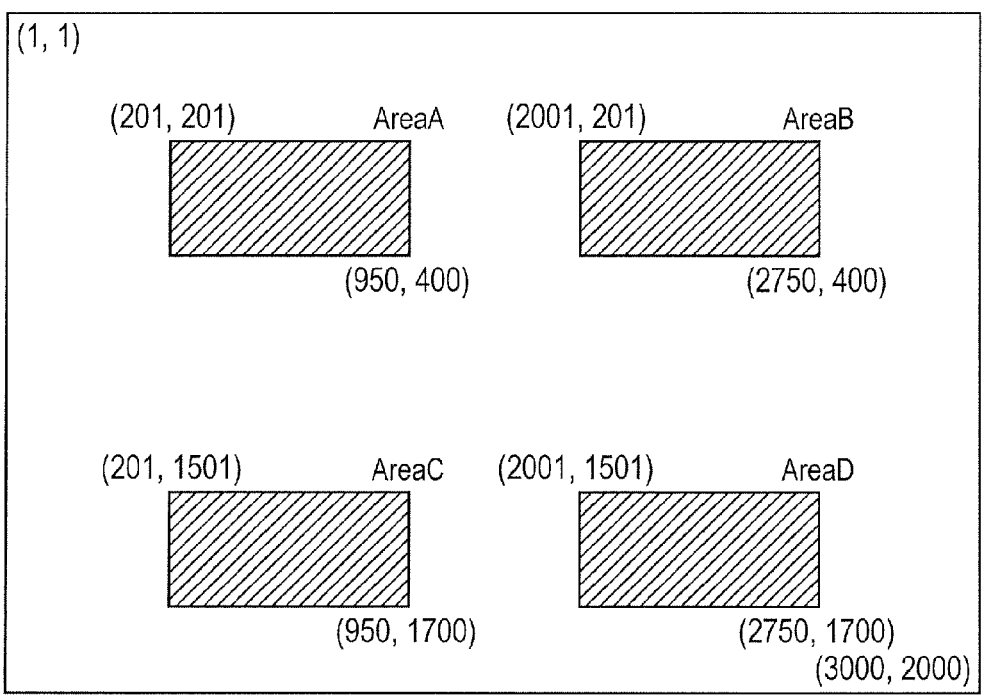
FIG. 24 is a diagram illustrating a setting example of a readout object area in an image pickup element according to a fourth embodiment of the present invention.

In this embodiment, an image pickup example where four interest areas of the image sensor 101 are set is described. FIG. 24 illustrates an example where the image sensor 101 includes image pickup elements of 3,000 pixels in width and 2,000 lines in height. In FIG. 24, the four interest areas of AreaA, AreaB, AreaC, and AreaD are indicated by oblique lines. This embodiment is described by way of example where exposure levels are set equal between when all pixel signals illustrated in FIG. 24 are read out and when the four interest areas of the shaded parts are extracted to be read out.

Figure 25:
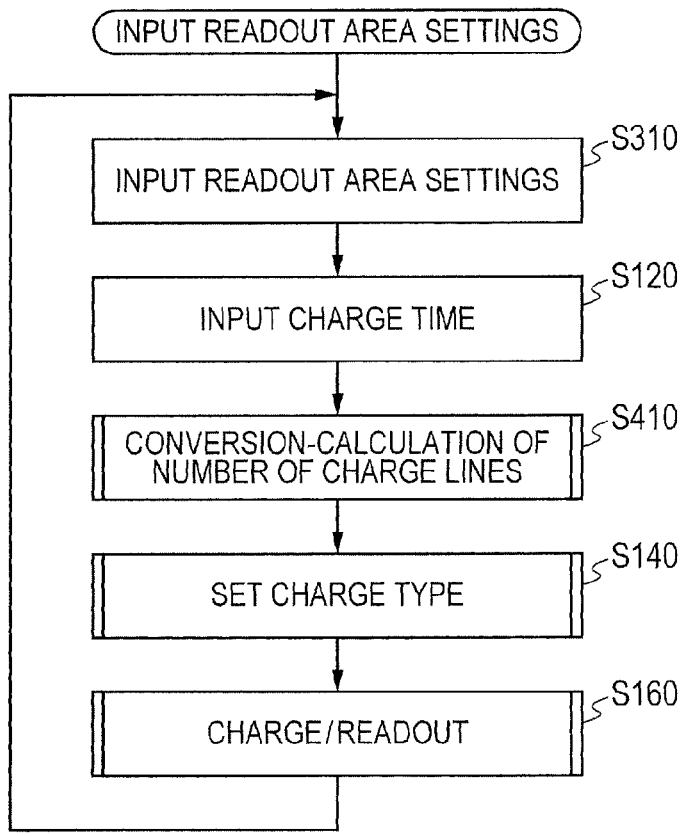
FIG. 25 is a flowchart illustrating readout processing of an image pickup apparatus according to the fourth embodiment.

FIG. 25 is a flowchart illustrating processing of the image pickup apparatus 100 according to this embodiment. When power is turned ON for the image pickup apparatus 100, the processing is carried out in order from Step S310 illustrated in FIG. 25.

First, in Step S310 of the flowchart illustrated in FIG. 25, readout area setting is input. Step S310 is similar to that illustrated in FIG. 20 of the third embodiment, and thus description thereof is omitted. According to this embodiment, only the areas of the shaded parts illustrated in FIG. 24 are read out. As in the case of the third embodiment, start coordinates (X, Y) and end coordinates (X, Y) of the readout areas are input by a readout condition setter 300 illustrated in FIG. 1. The coordinates of each of the readout areas illustrated in FIG. 24 are as follows.

AreaA: start coordinates (201, 201), end coordinates (950, 400)
AreaB: start coordinates (2001, 201), end coordinates (2750, 400)
AreaC: start coordinates (201, 1501), end coordinates (950, 1700)
AreaD: start coordinates (2001, 1501), end coordinates (2750, 1700)

A readout setting value is stored in a readout condition input unit 107 illustrated in FIG. 1 as described above, and input to a charge controller 109. After the execution of Step S310 illustrated in FIG. 25, the processing proceeds to Step S120. In Step S120, charge time corresponding to a shutter speed is input as in the case of the first embodiment. After the execution of Step S120, the processing proceeds to Step S410.

Figure 26:
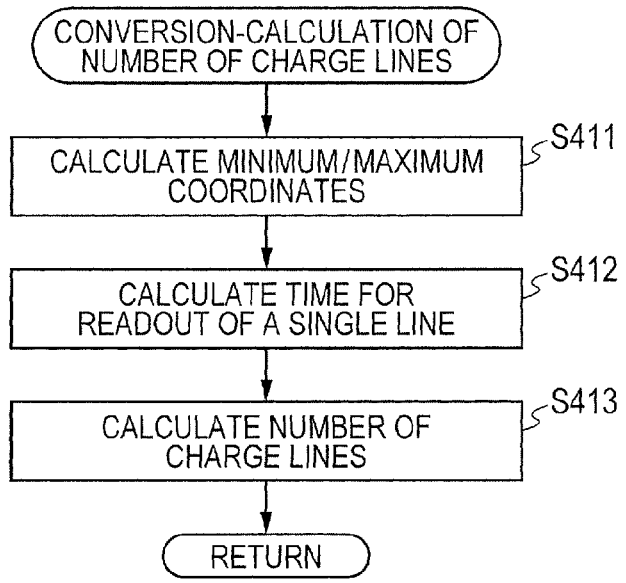
FIG. 26 is a flowchart illustrating a subroutine of Step S410 of the readout processing illustrated in FIG. 25.

In Step S410 illustrated in FIG. 25, the charge time is converted by calculation into the number of charge lines in accordance with the definition described above. FIG. 26 illustrates a subroutine of Step S410.

Figure 27:
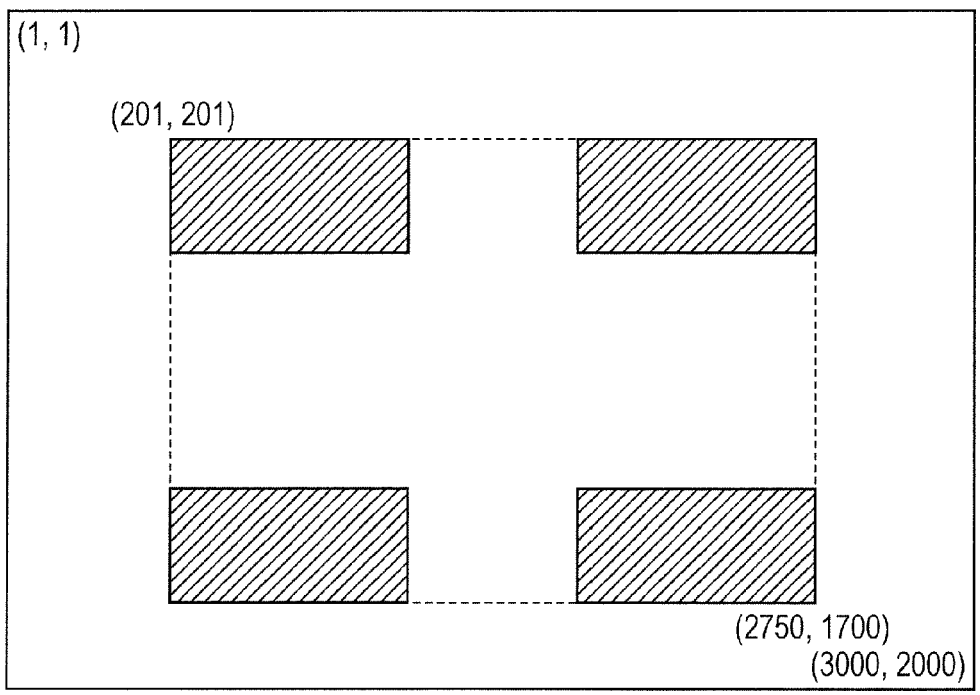
FIG. 27 is an explanatory diagram illustrating a readout object area in the image pickup element according to the fourth embodiment.

In the subroutine illustrated in FIG. 26, the processing is carried out in order from Step S411. First, in Step S411, minimum and maximum coordinates of the readout areas are calculated. The minimum and maximum coordinates of X and Y are acquired from coordinates of the areas AreaA to AreaD. As illustrated in FIG. 27, when the areas AreaA to AreaD are regarded as one area AreaE, the following minimum and maximum coordinates are acquired:

AreaE: minimum coordinates (201, 201), maximum coordinates (2750, 1700)

Proceeding to Step S412 illustrated in FIG. 26, readout time per line is calculated. First, a width of the AreaE is calculated to be 2,550 pixels. Time for reading out this number of width pixels is set as readout time per line. As in the case of the first embodiment, calculation is carried out based on readout time per pixel and the number of width pixels of the AreaE in view of overhead time for reading out a single line. Then, proceeding to Step S413, the number of charge lines is calculated by dividing the charge time input in Step S120 by the readout time per line calculated in Step S412. After the execution of Step S413, the subroutine illustrated in FIG. 26 is ended, and the processing proceeds to Step S140 illustrated in FIG. 25.

In Step S140 illustrated in FIG. 25, a charge type is set. The processing carried out in Step S140 is similar to those of the first to third embodiments, and thus description thereof is omitted. After the execution of Step S140, the processing proceeds to Step S160.

Figure 28:
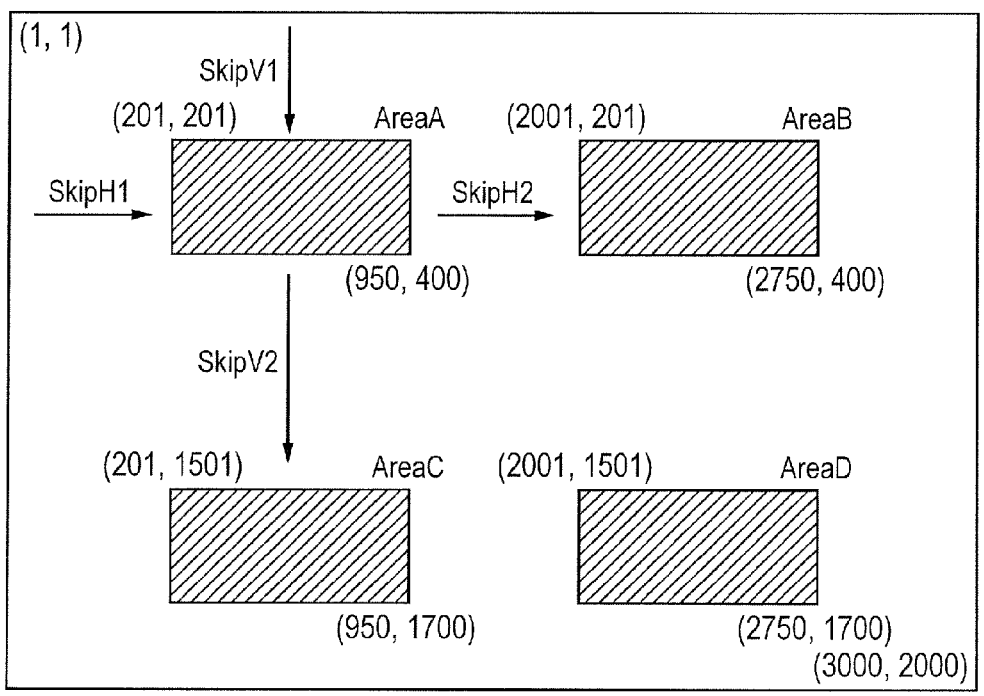
FIG. 28 is an explanatory diagram illustrating a skip area in the image pickup element according to the fourth embodiment.

In Step S160 illustrated in FIG. 25, charge/readout processing is carried out. The processing carried out in Step S160 is similar to that of the third embodiment. Referring to FIG. 28, readout areas and areas to be skipped are described. The first to 200th lines of the image sensor 101 are skipped by the same method as that of the third embodiment illustrated in FIGS. 17 and 18. Then, the 201st line and thereafter are read out.

In areas SkipH1 and SkipH2 illustrated in FIG. 28, it is preferred to carry out pixel skipping. However, readout processing may be carried out when necessary because of a structure of the image sensor to be used. An area from the 401st line to the 1,500th line is not designated as a readout area. FIG. 28 illustrates this area as SkipV2. In the area SkipV2, skipping is carried out by continuously inputting pulses to the control line LineShift of the image sensor 101 as described above. After the execution of skipping up to the 1,500th line, readout is carried out again from the 1,501st line. Readout processing from the 1,501st line to the 1,700th line is similar to that from the 201st line to the 400th line. Thus, the charge/readout processing carried out in Step S160 enables readout of AreaA, AreaB, AreaC, and AreaD.

According to this embodiment, when the plurality of readout areas are set, the number of charge lines is calculated based on the set charge time and the readout time per line of the readout object area. Through this calculation of the number of charge lines, even when the readout area setting is changed, exposure can be set equal before and after the change.

In Step S412 illustrated in FIG. 26, the readout time per line is calculated based on the number of width pixels of the AreaE, that is, 2,500 pixels. However, as described above, the calculation is based on the assumption that the area between the AreaA and the AreaB is readout. When waiting time in the case of truly skipping the area between the AreaA and the AreaB is negligible, readout time per line may be calculated by adding together the numbers of width pixels of the AreaA and the AreaB, that is, by setting the width to be 1,500 pixels. Then, based on the readout time per line, the number of charge lines may be calculated so as to set charge time constant before and after setting of the interest area. In the charge/readout processing carried out in Step S160 illustrated in FIG. 25, as illustrated in FIG. 28, skipping may be carried out as indicated by SkipV2 when pixels between the AreaA and the AreaB and pixels between the AreaC and the AreaD are read out.

While the embodiments according to the present invention have been described, it is to be understood that the invention is not limited to the disclosed embodiments, and various modifications and changes can be made within the gist of the present invention. Further, the embodiments described herein may be combined to implement the present invention.

The present invention has been described by way of example where "2" and "4" are set as the skip unit numbers. However, the number of skip units may be arbitrarily set. The number of readout lines has been described to be "1" with respect to the number of skip units. However, as described above, when color photographing is carried out, the number of readout lines may be set in view of a Bayer array to be applied. The present invention has been described by way of example where up to four interest areas are set. However, there is no limitation on the number of interest areas, coordinates, and sizes of the areas. The present invention is applicable when the number of interest areas (readout areas) is at least one. The photographing image has been described by way of example of the pixel number of 3,000×2,000. However, the number of pixels is not limited to this number.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2014-017340, filed Jan. 31, 2014, which is hereby incorporated by reference herein in its entirety.

What is claimed is:

1. An image pickup system capable of reading out and outputting pixel data of a partial area of a rolling shutter type image sensor, the image pickup system comprising:
   a controller that controls accumulation of the image sensor and signal readout from the image sensor so as to achieve constant accumulation time irrespective of a readout condition of the image sensor,
   wherein the controller starts accumulation of a readout object line and signal readout of a line next to the readout object line after signal readout from the readout object line is ended in a case where the accumulation time is equal to or longer than a readout time for reading out all readout object pixel signals, and starts accumulation of the readout object line and signal readout of the readout object line after signal readout from all readout object lines is ended in a case where the accumulation time is shorter than the readout time for reading out all the readout object pixel signals.

2. The image pickup system according to claim 1, wherein the controller controls the accumulation of the image sensor and the signal readout from the image sensor so that accumulation time before the change of the readout condition and accumulation time after the change of the readout condition are equal to each other in case where the readout condition is changed.

3. The image pickup system according to claim 1, further comprising a count number setter that sets a count number corresponding to the accumulation time based on the readout condition,
   wherein the controller controls the accumulation of the image sensor and the signal readout from the image sensor so as to achieve the constant accumulation time irrespective of the readout condition based on the count number.

4. The image pickup system according to claim 3, wherein:
   the readout condition of the image sensor comprises at least one readout area in the image sensor; and
   the count number setter sets the count number based on the accumulation time, readout time per unit line of the readout area, and the readout area.

5. The image pickup system according to claim 3, wherein the readout condition of the image sensor comprises a skip unit indicating a number of lines of a unit pattern of readout lines and skip lines of the image sensor.

6. The image pickup system according to claim 5, wherein:
   the readout condition of the image sensor comprises at least one readout area in the image sensor; and
   the count number setter sets the count number based on the accumulation time, readout time per unit line of the readout area, the readout area, and the skip unit.

7. The image pickup system according to claim 6, wherein the count number setter sets the count number based on the accumulation time and the skip unit in a case where the accumulation time is equal to or longer than the readout time for reading out all the readout object pixel signals, and sets the count number based on the accumulation time and a number of readout object lines of the readout area in a case where the accumulation time is shorter than the readout time.

8. The image pickup system according to claim 1, wherein the readout condition of the image sensor comprises at least one readout area in the image sensor.

9. The image pickup system according to claim 1, further comprising a lens.

10. An operating method of an image pickup apparatus capable of reading out and outputting pixel data of a partial area of a rolling shutter type image sensor, the method comprising:
    controlling accumulation of the image sensor and signal readout from the image sensor so as to achieve constant accumulation time irrespective of a readout condition of the image sensor,
    wherein the controlling starts accumulation of a readout object line and signal readout of a line next to the readout object line after signal readout from the readout object line is ended in a case where the accumulation time is equal to or longer than a readout time for reading out all readout object pixel signals, and starts accumulation of the readout object line and signal readout of the readout object line after signal readout from all readout object lines is ended in a case where the accumulation time is shorter than the readout time for reading out all the readout object pixel signals.

* * * * *